(12) United States Patent
Bharatiya et al.

(10) Patent No.: US 12,532,802 B2
(45) Date of Patent: Jan. 27, 2026

(54) SYSTEMS AND METHODS FOR SELECTIVE FERTILIZER PLACEMENT

(71) Applicant: Deere & Company, Moline, IL (US)

(72) Inventors: Paresh Bharatiya, Pune (IN); Michael C. Steele, Orion, IL (US); Lester Mcmackin, Columbus, GA (US)

(73) Assignee: DEERE & COMPANY, Moline, IL (US)

( * ) Notice: Subject to any disclaimer, the term of this patent is extended or adjusted under 35 U.S.C. 154(b) by 427 days.

(21) Appl. No.: 18/181,828

(22) Filed: Mar. 10, 2023

(65) Prior Publication Data
US 2024/0298570 A1 Sep. 12, 2024

(51) Int. Cl.
| | | |
|---|---|---|
| A01C 7/06 | (2006.01) | |
| A01C 23/00 | (2006.01) | |
| A01C 23/02 | (2006.01) | |

(52) U.S. Cl.
CPC .............. *A01C 23/007* (2013.01); *A01C 7/06* (2013.01); *A01C 23/023* (2013.01)

(58) Field of Classification Search
CPC ........ A01C 7/06; A01C 23/007; A01C 23/023
See application file for complete search history.

(56) References Cited

U.S. PATENT DOCUMENTS

| | | | | |
|---|---|---|---|---|
| 5,668,719 A * | 9/1997 | Bobrov | ............... | A01M 7/0092 702/2 |
| 6,442,486 B1 * | 8/2002 | Satake | ................... | G06Q 10/04 250/226 |
| 10,912,251 B2 * | 2/2021 | Pickett | ................. | A01C 21/007 |
| 11,040,357 B2 * | 6/2021 | Grimm | ................. | B05B 1/3093 |
| 11,596,964 B2 * | 3/2023 | Hendrickson | ......... | A01M 7/006 |
| 11,812,681 B2 * | 11/2023 | Sibley | ................. | A01B 69/004 |
| 2010/0032492 A1 * | 2/2010 | Grimm | ............... | A01M 7/0089 239/76 |
| 2012/0215410 A1 * | 8/2012 | McClure | ................. | G01S 19/14 701/50 |
| 2013/0269578 A1 | 10/2013 | Grimm et al. | | |
| 2014/0048002 A1 | 2/2014 | Grimm et al. | | |
| 2014/0230391 A1 * | 8/2014 | Hendrickson | ...... | G01N 33/0098 702/2 |
| 2015/0027044 A1 * | 1/2015 | Redden | ............... | A01M 21/043 47/58.1 R |
| 2016/0178422 A1 * | 6/2016 | Humpal | ................ | A01M 7/006 239/71 |
| 2016/0368011 A1 * | 12/2016 | Feldhaus | ............... | B05B 12/124 |
| 2018/0338405 A1 * | 11/2018 | Connell | ............... | B62D 55/084 |
| 2019/0029170 A1 * | 1/2019 | Wilger | ................ | B05B 12/006 |
| 2019/0124826 A1 * | 5/2019 | Pickett | ................... | A01C 23/02 |
| 2019/0126308 A1 * | 5/2019 | Hendrickson | ............. | B05B 1/20 |
| 2019/0128864 A1 * | 5/2019 | Pickett | ................ | A01M 7/0089 |
| 2019/0159398 A1 * | 5/2019 | McMenamy | ........ | A01C 23/028 |
| 2020/0360950 A1 * | 11/2020 | Anderson | ............ | A01C 17/008 |

(Continued)

OTHER PUBLICATIONS

Extended European Search Report and Written Opinion issued in European Patent Application No. 24155764.4 dated Jul. 19, 2024, in 9 pages.

*Primary Examiner* — Jamie L Mcgowan
(74) *Attorney, Agent, or Firm* — Christopher J. Volkmann; KELLY, HOLT & CHRISTENSON PLLC

(57) ABSTRACT

Locations of seeds in a field can be identified using event-based processing or frequency-based processing. A material is applied to the field, based upon the seed locations.

20 Claims, 25 Drawing Sheets

(56) References Cited

U.S. PATENT DOCUMENTS

2021/0378165 A1\* 12/2021 Hubner .................. A01C 5/062
2021/0378228 A1\* 12/2021 Klemann ............. A01C 23/047
2022/0192174 A1\* 6/2022 Humpal ............. A01M 7/0042

\* cited by examiner

SYSTEMS AND METHODS FOR SELECTIVE FERTILIZER PLACEMENT

FIELD OF THE DESCRIPTION

The present description relates to agricultural machines. More specifically, the present description relates to controlling application of material to a field, using an agricultural machine.

BACKGROUND

There is a wide variety of different types of agricultural machines that apply material to an agricultural field. Some such agricultural machines include sprayers, tillage machines with side dressing bars, air seeders, and planters that have row units.

As one example, a row unit is often mounted to a planter with a plurality other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set depth of penetration of the disk openers.

Row units can also be used to apply material to the field (e.g., fertilizer to the soil, to a seed, etc.) over which they are traveling. In some scenarios, each row unit has a valve that is coupled between a source of material to be applied, and an application assembly. As the valve is actuated, the material passes through the valve, from the source to the application assembly, and is applied to the field.

Many current systems apply the material in a substantially continuous way. For instance, where the application machine is applying a liquid fertilizer, the application machine actuates the valve to apply a substantially continuous strip of the liquid fertilizer (sometimes referred to as a broadcast application pattern). The same is true of materials that provide other liquid substances, or granular substances, as examples.

The discussion above is merely provided for general background information and is not intended to be used as an aid in determining the scope of the claimed subject matter.

SUMMARY

A pair of actuators are disposed on a row unit of a planter. The actuators are actuated to apply material to a furrow according to two different application patterns.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
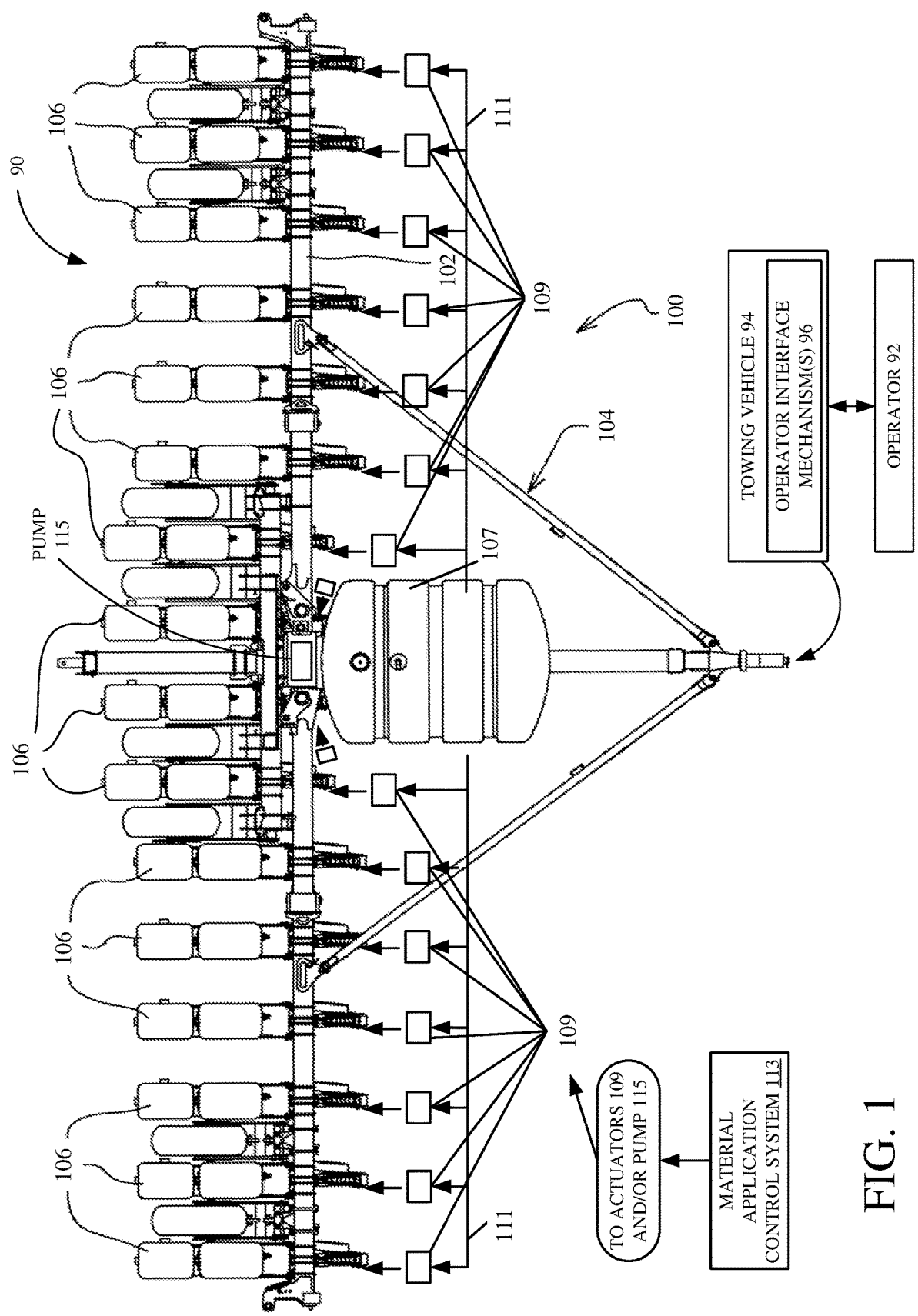
FIG. 1 is a top view of one example of a planting machine, shown in a partial pictorial and partial schematic form.

As discussed above, many current systems apply material to a field in a relatively continuous way. This can result in wasted material. For instance, some material that is applied at certain locations between seeds or plants in a field may be unnecessary. This can result in lower productivity and lower efficiency. This problem can be exacerbated in instances where the material is applied at a relatively high rate, such as in the case of high rate fertilizer application.

Some other systems attempt to apply material discontinuously, such as at seed locations, between seed locations, etc. However, some materials are best applied continuously while other materials are best applied intermittently or discontinuously. For instance, it may be that one type of fertilizer is best applied continuously while another type of fertilizer is best applied only between seed locations. Also, it may be that some material is best applied continuously at a base rate, but intermittently at a higher rate. For instance, it may be that fertilizer is best applied continuously (e.g., a broadcast application pattern) at a lower rate between seeds but at a higher rate at the seed locations.

The present description thus proceeds with respect to a system that applies material with row units that have a plurality of different actuators. The system identifies a specific location, e.g., a seed location, and controllably dispenses or applies material with the plurality of actuators, based upon the seed location (and/or position) in a field. The system applies material with one actuator at one rate or according to one application pattern (e.g., continuously) and applies material with a second actuator at a different rate or according to a different application pattern (e.g., intermittently) based on seed location. The system can do this by sensing seeds, as they are planted in the soil, and then calculating a time when the application actuators, e.g., valves, a nozzles, a pumps, etc. should be actuated to apply the material, based upon the location of the valves, pumps, or nozzles or other actuator relative to the location of the seed. Similarly, a prior seed map can be obtained indicating where seeds will be planted (e.g., prior seed locations) and the system controllably dispenses or applies material with the plurality of actuators based on those prior locations. The seeds can then be planted later. Further, the system can be used to apply the material with the plurality of actuators on each row unit and generate a material map of the locations where the material was applied. A seed map can be generated based on the material map, and seeds can be planted based on that seed map. Other things can be considered as well when actuating the actuators to apply material, such as the responsiveness of the valve or nozzle or other actuator, the material properties of the material being applied, etc.

Also, the present description proceeds with respect to the examples being deployed on a row unit of a planter. They could just as easily be deployed on a tillage machine with a side-dress bar, or other piece of agricultural equipment that is used to apply a material.

FIG. 1 is a partial pictorial, partial schematic top view of one example of an agricultural system 90 that includes agricultural planting machine 100, towing vehicle 94, that is operated by operator 92, and material application control system 113, which can be on one or more individual parts of machine 100, centrally located on machine 100, remotely located, or located on towing vehicle 94. Operator 92 can illustratively interact with operator interface mechanisms 96 to manipulate and control vehicle 94, system 113, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be stored in a tank 107 (or material(s) can be stored in a plurality of tanks) and pumped through one or more supply lines 111 so the material can be dispensed or applied in or near the rows being planted. In one example, a set of actuators 109 is provided to perform the application operation. For instance, actuators 109 can be individual pumps that service individual row units 106 and that pump material from tank(s) 107 through supply line(s) 111 so the material(s) can be dispensed on the field. In such an example, material application control system 113 controls the pumps 109. In another example, actuators 109 are valves or nozzles and one or more pumps 115 pump the material from tank(s) 107 to the valves or nozzles 109 through supply line(s) 111. In such an example, material application control system 113 controls valves or nozzles 109 by generating actuator control signals, e.g., on a per-seed basis, as described below or in other ways. The control signal for each valve or nozzle can, in one example, be a pulse width modulated control signal. The flow rate through the corresponding valve or nozzle 109 can be based on the duty cycle of the control signal (which controls the amount of time the valve is open and closed). The flow rate or quantity can be based on multiple duty cycles of multiple valves or nozzles or based on other criteria. Further, the material can be applied in varying rates on a per-seed or per-plant basis. For example, fertilizer may be applied at one rate when it is being applied at a location spaced from a seed location and at a second, higher, rate when it is being applied closer to the seed location. Multiple actuators 109 are, for example, provided on each row unit 106 so that one or more materials can be applied by one actuator 109 relative to the furrow according one application pattern (e.g., continuously) and by another actuator 109 according to another application pattern (e.g., intermittently) or at a second rate. These are examples only.

Figure 2:
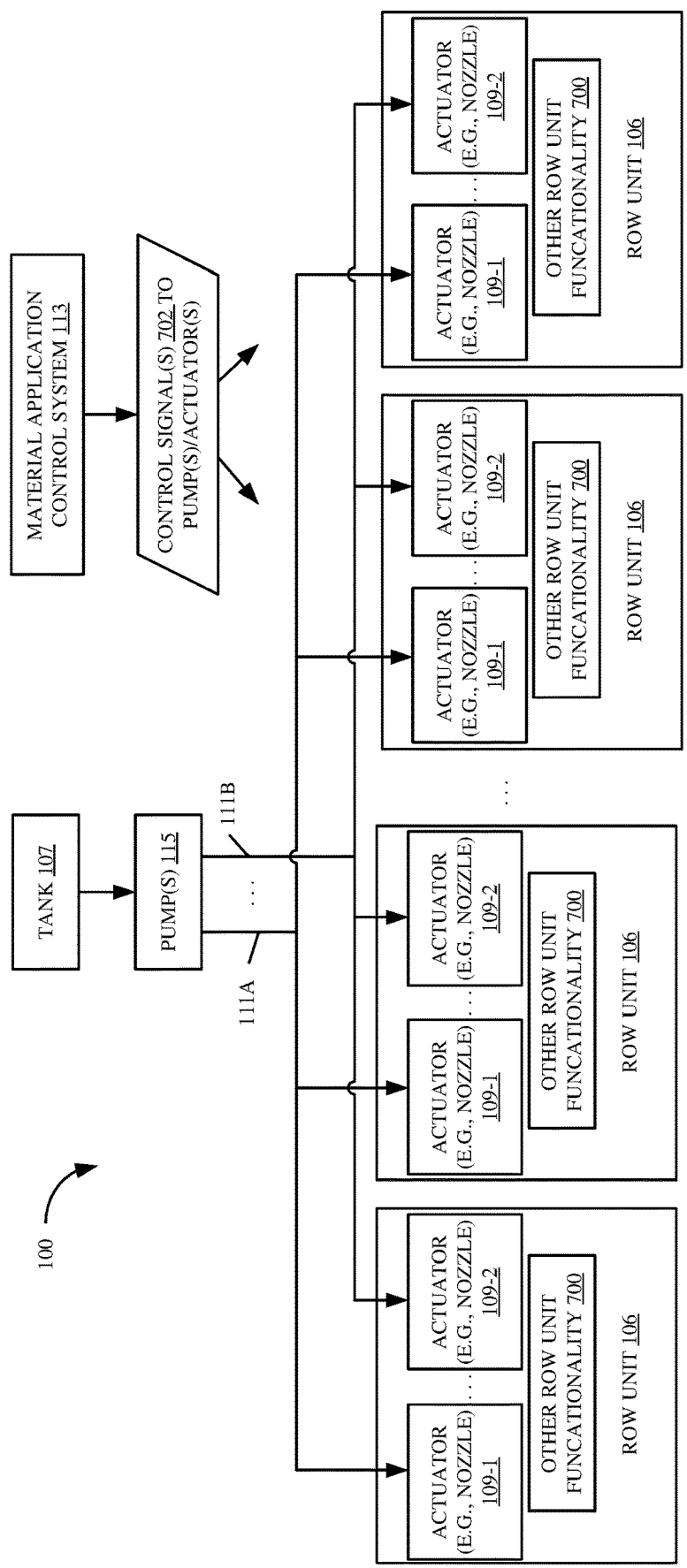
FIG. 2 shows a block diagram of one example of a portion of an agricultural system.

FIGS. 2-5 show different architectures in which actuators 109 can be disposed in different places, in which there can be multiple different materials applied by each row unit 106, and/or in which a single material can be applied, using two or more different actuators to apply that material at different rates in the same furrow. In the example shown in FIG. 2, an architecture for machine 100 is illustrated in which a single tank 107 holds material that is pumped by one or more pumps 115 through a plurality of different supply lines (labeled 111A-111B in FIG. 2) to a plurality of different actuators (e.g., nozzles) 109 on each row unit 106. Each row unit 106 shows a plurality of nozzles 109 (labeled 109-1 to 109-2), along with other row unit functionality 700 some of which is described in greater detail elsewhere herein. FIG. 2 also shows that material application control system 113 can generate control signals 702 which are provided to control the different actuators 109 on the different row units 106. In the example shown in FIG. 2, material is pumped by pump(s) 115 through supply line 111A to a first actuator 109-1 on each row unit 106. Also, pump(s) 115 provide the same material through a supply line 111B to a second actuator 109-2 on each of the row units 106. Therefore, material application control system 113 can generate control signals 702 to independently control the individual actuators 109-1 and 109-2 independently of one another on each of the row units 106 so that the material from tank 107 can be applied according to a first application pattern (e.g., continuously in a furrow) using actuator 109-1 and according to a second application pattern (e.g., intermittently based upon seed position in the furrow) using actuator 109-2. Also, it will be appreciated that, in one example, the individual actuators 109-1 can be independently controlled with respect to one another so that actuator 109-1 on one row unit 106 may be controlled independently with respect to the actuator 109-1 on a different row unit. The same can be true of actuators 109-2.

Figure 3:
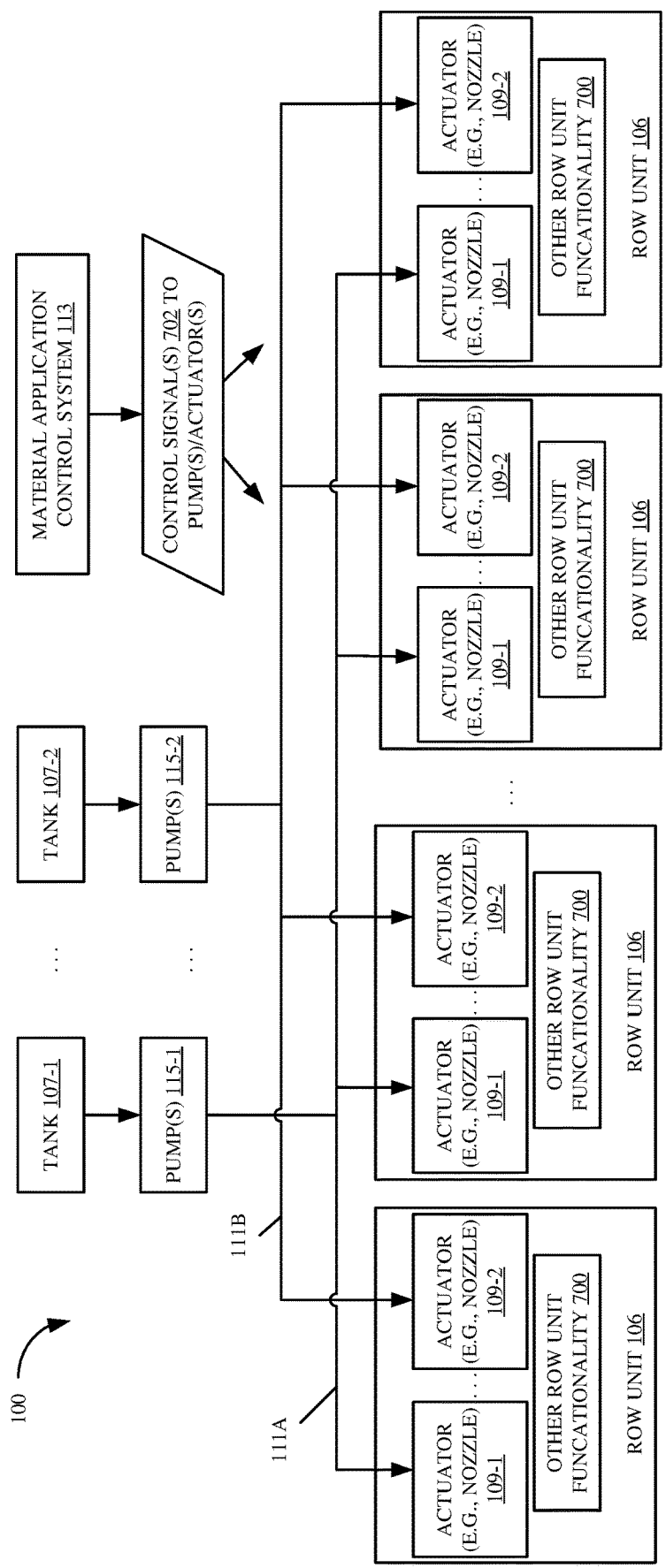
FIG. 3 shows a block diagram of one example of a portion of an agricultural system.

FIG. 3 shows another example of an architecture for machine 100 in which a plurality of different tanks 107-1 through 107-2 are each provided with a set of pumps 115-1 through 115-2. Some items in FIG. 3 are similar to those shown in FIG. 2, and those items are similarly numbered. Therefore, a different material can be stored in each of the tanks 107-1 through 107-2. Pump 115-1 can pump the material from tank 107-1 to the actuators 109-1 in each of the row units 106 while pumps 115-2 can pump the material from tank 107-2 to supply line 111B to the actuators 109-2 on each of the row units 106.

Thus, material application control system 113 can generate control signals 702 to independently control the pumps 115-1 through 115-2 and the actuators 109-1 through 109-2 so that the material from tank 107-1 can be applied in the furrow opened by a given row unit 106 at one rate while the material in tank 107-2 can be applied by the same row unit 106 at a second rate. Again, for example, the material in tank 107-1 can be applied continuously while the material from tank 107-2 can be applied intermittently, or vice versa.

Figure 4:
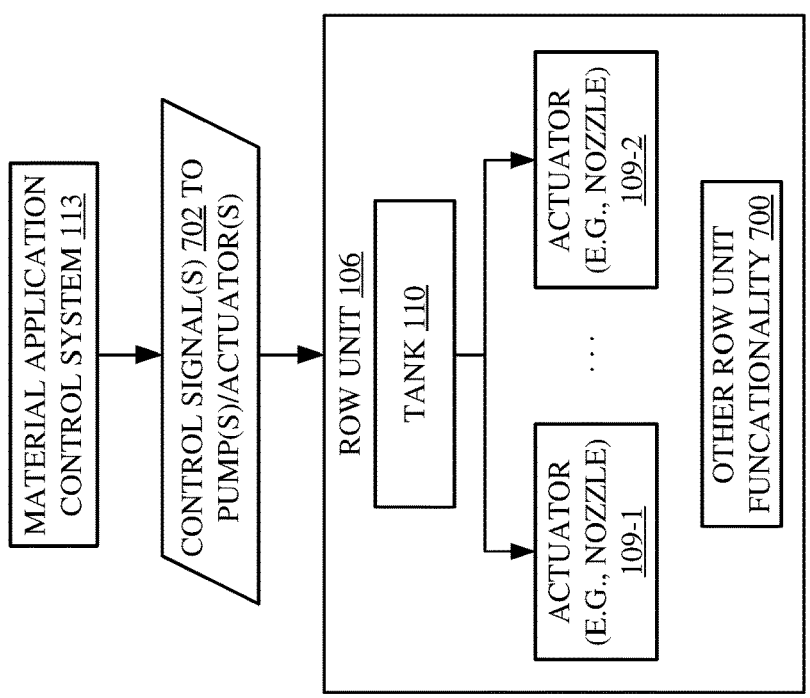
FIG. 4 shows a block diagram of one example of a portion of an agricultural system.

FIG. 4 shows another example in which a row unit 106, itself, has a tank 110 that stores material that is to be applied by actuators 109-1 through 109-2. Because each row unit 106 has a plurality of different, independently controllable, actuators 109-1 through 109-2, the material from tank 110 (carried by row unit 106) can be applied at different rates by the different actuators 109-1 to 109-2. Material application control system 113 generates control signals 702 to control the actuators 109-1 through 109-2 independently of one another, so that the material in tank 110 can be applied at different rates, or using different application patterns. While FIG. 4 shows only a single row unit 106, the plurality of row units on machine 100 described above can be arranged similarly to that shown in FIG. 4.

Figure 5:
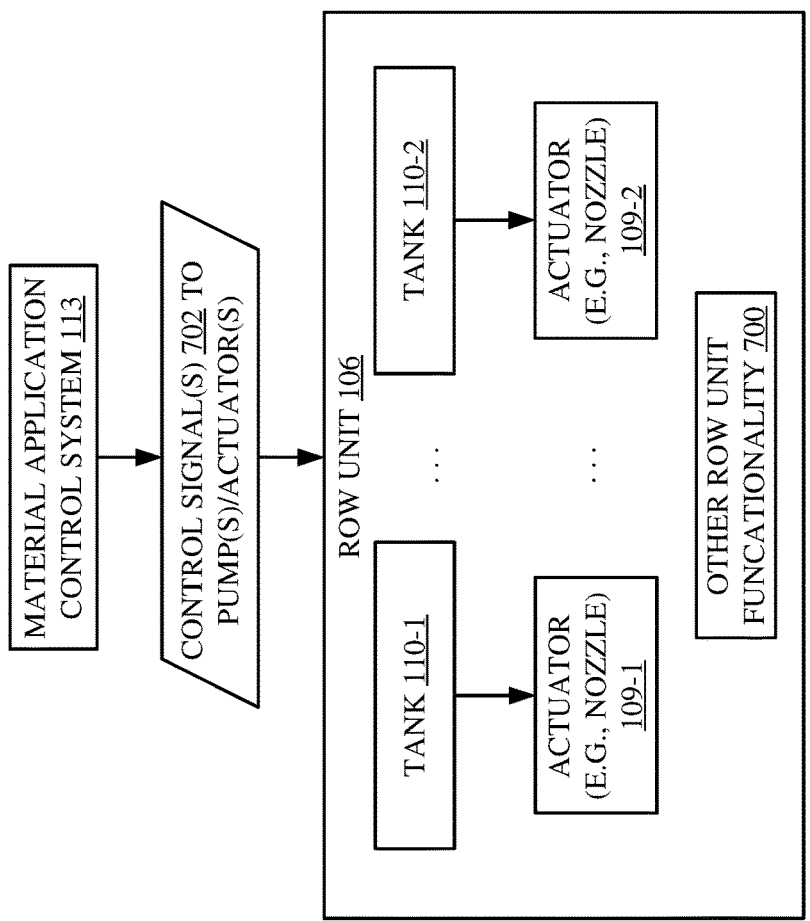
FIG. 5 shows a block diagram of one example of a portion of an agricultural system.

FIG. 5 shows an arrangement in which each row unit 106 has a plurality of tanks 110-1 through 110-2. Tank 110-1 may carry a different material from tank 110-2. The material from tank 110-1 can be applied using actuator 109-1 while the material from tank 110-2 can be applied using actuator 109-2. Therefore, material application control system 113 can generate 6 control signals 702 to control the actuators 109-1 through 109-2 independently of one another such that the different materials (stored in tanks 110-1 through 110-2) can be applied at different rates or according to different application patterns with respect to one another.

Some examples of the functionality on row units 106 will now be described with respect to FIGS. 6-13.

Figure 6:
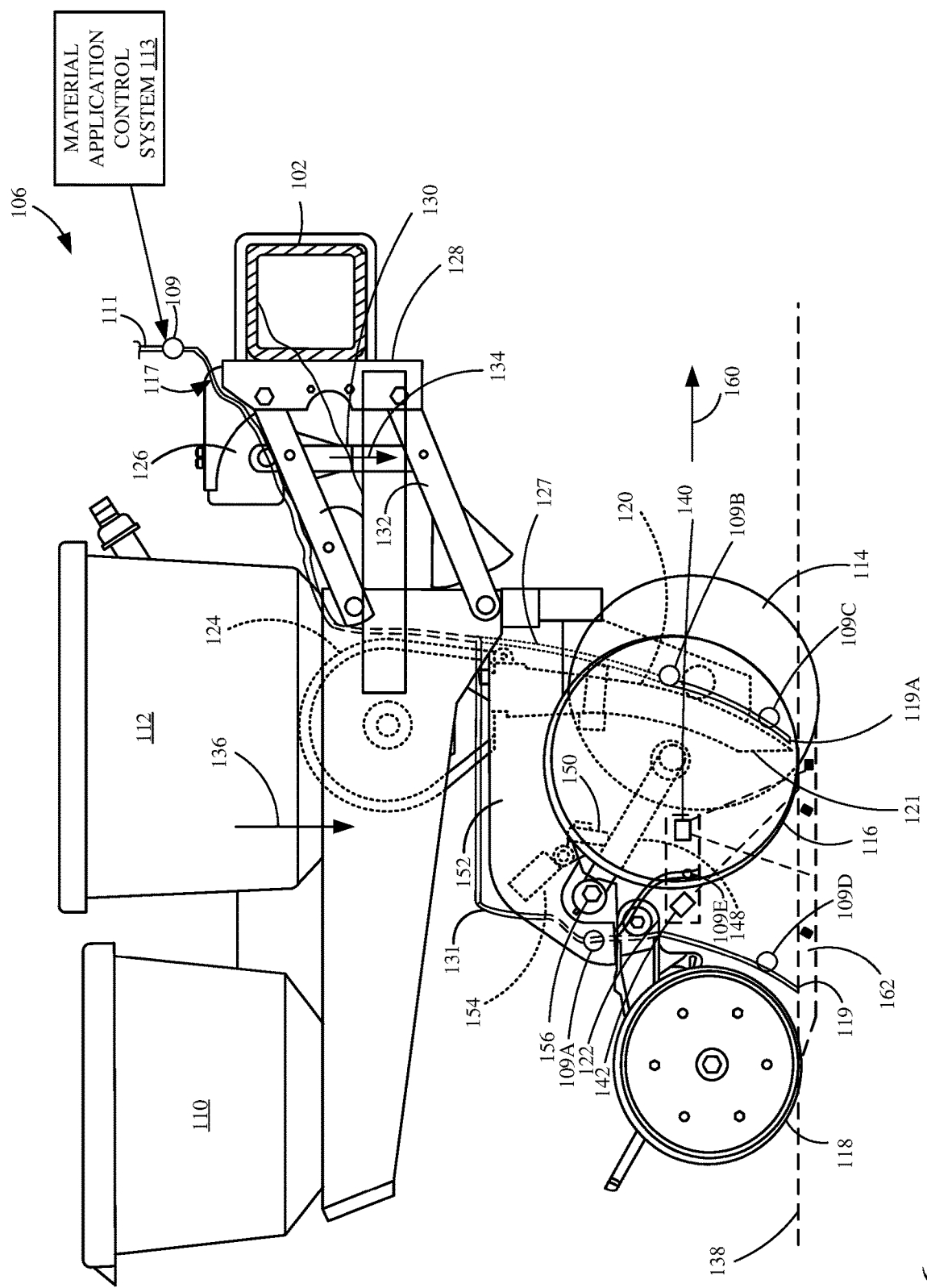
FIG. 6 is a side view showing one example of a row unit of the planting machine illustrated in FIG. 1.

FIG. 6 is a side view of one example of a row unit 106, with actuator 109 and system shown as well. Actuator 109 is shown in six possible locations labeled as 109, 109A, 109B, 109C, 109D, and 109E. It will be appreciated that row unit 106 will illustratively have a plurality of independently controllable actuators 109 (such as actuators 109-1 to 109-2 shown elsewhere herein) that can be each located at one or more of the different locations 109-109E or at other locations on row unit 106. Row unit 106 illustratively includes a chemical tank 110 and a seed storage tank 112. Row unit 106 also illustratively includes one or more disc openers 114, a set of gauge wheels 116, and a set of closing wheels 118. Seeds from tank 112 are fed into a seed meter 124, e.g., by gravity or from a centralized commodity distribution system (e.g., exploiting pneumatic commodity distribution to each row unit). The seed meter 124 controls the rate at which seeds are dropped into a seed tube 120 or other seed delivery system, such as a brush belt or flighted belt (shown in other FIGS.), from seed storage tank 112. The seeds can be sensed by a seed sensor 122.

In the example shown in FIG. 6, liquid material is passed, e.g., pumped or otherwise forced, through one or more supply lines 111 to an inlet end of each actuator 109. Each actuator 109 is controlled by control system 113 to allow the liquid to pass from the inlet end of actuator 109 to an outlet end. One example of the application of material through an actuator 109 will be discussed but it will be appreciated that the row unit 106 will have a plurality of independently controllable actuators 109 so one or more materials can be applied at different rates or according to different application patterns (e.g., continuously, intermittently, etc.). By mentioning that the different actuators are actuated to apply material according to a different application pattern it is meant, for example, that one actuator is controlled to apply material at a different rate than another actuator, or that one actuator applies material at one frequency or spatial pattern (such as continuously) that is different from a frequency or spatial pattern with which another actuator applies material (such as intermittently), and/or that one actuator applies a first material while another actuator applies a second material that is different from the first material.

As liquid passes through each actuator 109, the liquid travels through an application assembly 117 from a proximal end (which is attached to an outlet end of each actuator 109) to a distal tip (or application tip) 119, where the liquid is discharged into a trench, or proximate a trench or furrow 162, opened by disc opener 114 (as is described in more detail elsewhere).

Some parts of row unit 106 will now be discussed in more detail. First, it will be noted that there are different types of seed meters 124, and the one that is shown is shown for the sake of example only and is described in greater detail below. However, in one example, each row unit 106 need not have its own seed meter. Instead, metering or other singulation or seed dividing techniques can be performed at a central location, for groups of row units 106. The metering systems can include finger pick-up discs and/or vacuum meters (e.g., having rotatable discs, rotatable concave or bowl-shaped devices), among others. The seed delivery system can be a gravity drop system (such as seed tube 120 shown in FIG. 6) in which seeds are dropped through the seed tube 120 and fall (via gravitational force) through the seed tube and out the outlet end 121 into the seed trench 162. Other types of seed delivery systems may be or may include assistive systems, in that they do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to other FIGS.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 6, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106 (and indicated by arrow 136) is offset by upwardly directed forces acting on closing wheels (from ground 138) and disc opener 114 (again from ground 138). The remaining force (the sum of the force vectors indicated by arrows 134 and 136, minus the upward force on closing 6 wheels 118 and opener 114 and the force on any other ground engaging component on the row unit (not shown), is the differential force. The differential force may also be referred to herein as the downforce margin. The downforce margin acts on the gauge wheels 116. This load can be sensed by a gauge wheel load sensor, which may be located anywhere on row unit 106 where it can sense that load. The gauge wheel load sensor can also be placed where it may not sense the load directly, but a characteristic indicative of that load. For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth.

Arms (or gauge wheel arms) 148 illustratively abut against a mechanical stop (or arm contact member- or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted.

In operation, row unit 106 travels generally in the direction indicated by arrow 160. The double disc opener 114 opens a furrow 162 in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the furrow 162, e.g., push soil back into the furrow 162.

As the seeds are dropped through seed tube 120, the seeds can be sensed by seed sensor 122. Some examples of seed sensor 122 are described in greater detail below. Some examples of seed sensor 122 may include an optical or reflective sensor, which includes a radiation transmitter component and a receiver component. The transmitter component emits electromagnetic radiation and the receiver component then detects the radiation and generates a signal indicative of the presence or absence of a seed adjacent the sensors. In another example, row unit 106 may be provided with a seed firmer that is positioned to travel through the furrow 162, after seeds are placed in furrow 162, to firm the seeds in place. A seed sensor can be placed on the seed firmer and generate a sensor signal indicative of a seed. Again, some examples of seed sensors are described in greater detail below.

The present description proceeds with respect to the seed sensor being located to sense a seed passing it in seed tube 120, but this is for the sake of example only. Material application control system 113 illustratively receives a signal from seed sensor 122, indicating that a seed is passing sensor 122 in seed tube 120. System 113 then determines when to actuate actuators 109 so that material being applied through application assembly 117 (and out distal tip of application assembly 117) will be applied at a desired location relative to the seed in trench or furrow 162. This is all described in greater detail elsewhere herein as well. One brief example will be described now, by way of overview.

Material application control system 113 illustratively is programmed with, or detects a distance, e.g., a longitudinal distance, that the distal tip 119 is from the exit end 121 of seed tube 120. System 113 also illustratively senses, or is provided (e.g., by another component, such as a GPS unit or a tractor, etc.), the ground speed of row unit 106. As the row units 106 on an implement being towed by a prime mover (e.g., a tractor) may move faster or slower than the tractor during turns, particularly as the width of the implement increases, the material application control system 113 may sense or be provided the ground speed of each row unit 106 of the implement. By way of example, the material application control system 113 may sense or be provided information when the implement is turning right indicating that the rightmost row unit 106 is travelling slower, i.e., has a lower ground speed, than the leftmost row unit 106. Further, the material application control system 113 detects, is provided, or is programmed with, system data indicating the responsiveness of actuators 109 under certain conditions (such as under certain temperature conditions, certain humidity conditions, certain elevations, when spraying a certain type of fluid, etc.) and system 113 also detects, is provided, or programmed with one or more properties of the material being applied through actuators 109 (as this may affect the speed at which actuators 109 respond, the time it takes for the material to travel through application assembly 117 to the distal tip 119 and be applied to furrow 162, etc.). Further, material application control system 113 illustratively detects (or is provided with a sensor signal indicative of) the forward speed of row unit 106 in the direction generally indicated by arrow 160.

With this type of information, once system 113 receives a seed sensor signal indicating that a seed is passing sensor 122 in seed tube 120, system 113 determines the amount of time it will take for the seed to drop through the outlet end of seed tube 121 and into furrow 162 to reside at its final seed location and position in furrow 162. System 113 then determines when tip 119 will be in a desired location relative to that final seed location and actuates actuators 109 to apply the material at the desired location. By way of example, it may be that some material is to be applied directly on the seed. In that case, system 113 times the actuation of actuators 109 so that the applied material will be applied at the seed location. In another example, it may be desirable to apply some material at the seed location and also a predetermined distance on either side of the seed location along the furrow. In that case, system 113 generates the signal used to control actuators 109 so that the material is applied in the desired fashion. In other examples, it may be that the material is to be applied at a location between seeds in furrow 162. By way of example, relatively high nitrogen fertilizer may be most desirably applied between seeds, instead of directly on the seed. In that case, system 113 has illustratively been programmed with the desired location of the applied material, relative to seed location, so that system 113 can determine when to actuate actuators 109 in order to apply the material between seeds. Further, as discussed above, actuators 109 can be actuated to dispense material at a varying rate. Actuators 109 can dispense more material on the seed location and less at locations spaced from the seed location, or vice versa, or according to other patterns. Different actuators 109 on the same row unit 106 can apply the same or different materials according to the same or different application patterns.

It will be noted that a wide variety of different configurations are contemplated herein. For instance, in one example, actuators 109 may each be provided with material through a separate supply line 111 and may have a separate distal tip 119. Each actuator 109 may be placed closer to the distal tip 119 (such as indicated by actuator locations 109A and 109C). In this way, there is less uncertainty as to how long it will take the material to travel from the actuators 109A and 109C to the corresponding distal tip 119. In yet another example, the actuators are disposed at a different location (such as on seed tube 120) as indicated by actuators 109B and 109D. In those scenarios, again, actuator locations 109B and 109D are closer to the corresponding distal tip 119B and the material may be applied before and/or after the seed drops into furrow 162. For instance, when seed sensor 120 detects a seed, system 113 may be able to actuate actuator 109B to apply material to furrow 162, before the seed exits the exit end 121 of seed tube 120 while continuously actuating a separate actuator 109D which is fed material by a separate supply line 111 from actuator 109B. However, by the time the seed drops through distal end 121 of seed tube 120, the final seed location may be directly on the material applied by actuator 109B. In yet another example, system 113 can control actuator 109B so that it applies material, but then stops applying it before the seed exits distal end 121, again while continuously actuating actuator 109D to continuously apply material. In that case, the material may be applied continuously in the furrow 162 by actuator 109D and at a location behind the seed in furrow 162, relative to the direction indicated by arrow 160, by actuator 109B. This actuation timing enables the one or more materials to be applied between seeds, on seeds, continuously, and/or elsewhere. All of these and other configurations are contemplated herein.

Figure 7:
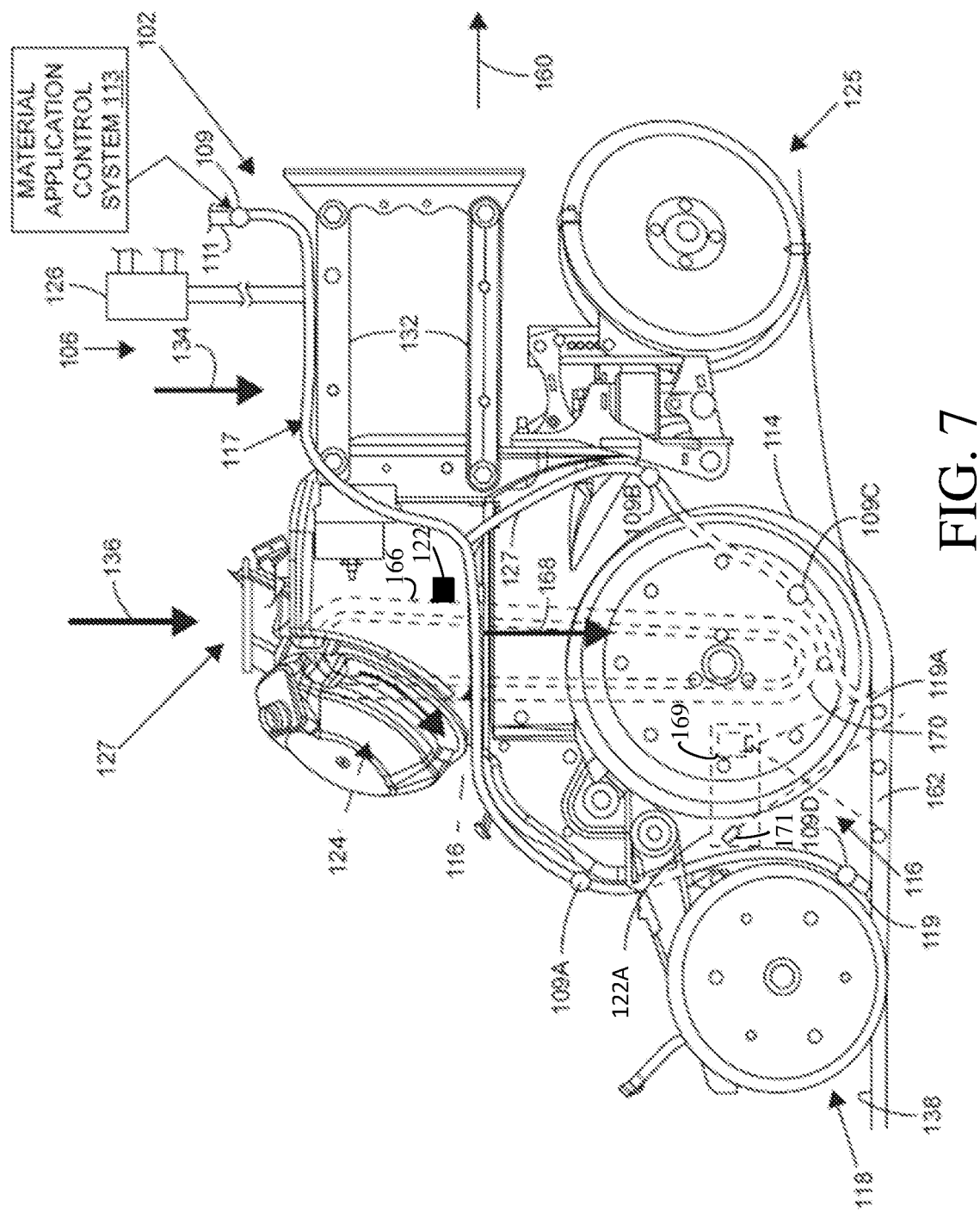
FIG. 7 is a side view showing another example of a row unit of the planting machine illustrated in FIG. 1.

FIG. 7 is similar to FIG. 6, and similar items are similarly numbered. However, instead of the seed delivery system being a seed tube 120, which relies on gravity to move the seed to the furrow 162, the seed delivery system shown in FIG. 3 is an assistive seed delivery system 166. Also, FIG. 7 shows that row unit 106 has a row cleaner 125 which clears residue and other material ahead of opener 114. In FIG. 7, row unit 106 also has a seed hopper 127 that provides seed to seed meter 124. Assistive seed delivery system 166 also illustratively has a seed sensor 122 disposed therein.

Assistive seed delivery system 166 captures the seeds as they leave seed meter 124 and moves them in the direction indicated by arrow 168 toward furrow 162. System 166 has an outlet end 170 where the seeds exit assistive system 166, into furrow 162, where they again reach their final resting location.

FIG. 7 also shows that row unit 106 may have an optical seed sensor 122A (in addition to, or instead of, seed sensor 122) with an image capture device 169 and an illumination source 171. When the seeds are dropped into the furrow 162, the seeds can be sensed by seed sensor 122A. Illumination source 142 may direct illumination onto an area of furrow 162. Camera 169 captures an image (or a sequence of images) of the illuminated area. An image processing system (located on sensor 122A, material application control system 113, at a remote location, and/or elsewhere) processes the image(s) to identify planting characteristics, such as seed location, seed type, seed orientation, seed (or furrow) depth, seed spacing, seed-to-soil contact, furrow integrity, anomalous material (such as rocks, plant matter, etc.), and/or other planting characteristics. The optical seed sensor 122A can be placed in a variety of different locations on row unit 106, or on different components of row unit 106, to obtain an image (or a sequence of images) of seeds in the furrow 162.

In a system where seed sensor 122 is used, material application control system 113 considers the speed at which delivery system 166 moves the seed from seed sensor 122 to the exit end 170. The system 113 also illustratively considers the speed at which the seed moves from the exit end 170 into furrow 162. For instance, in one example the seed simply drops from exit end 170 into furrow 162 under the force of gravity. In another example, however, the seed can be ejected from delivery system 166 at a greater or lesser speed than that which would be reached under the force of gravity. Similarly, it may be that the seed drops straight downward into furrow 162 from the outlet end 170. In another example, however, it may be that the seed is propelled slightly rearwardly from the outlet end 170, to accommodate for the forward motion of the row unit 106, so that the travel path of the seed is more vertical and so the seed rolls less once it reaches the furrow. Further, the seed can be ejected rearwardly and trapped against the ground by a trailing member (such as a pinch wheel) which functions to stop any rearward movement of the seed, after ejection, and to force the seed into firm engagement with the ground. Again, FIG. 7 also shows that a plurality of actuators 109 can be placed at any of a wide variety of different locations, some of which are illustrated by values 109A, 109B, 109C and 109D.

Where optical seed sensor 122A is used, material application control system 113 illustratively receives a signal from seed sensor 122A, indicating the planting characteristics discussed above, or other planting characteristics. Material application control system 113 can also receive a ground speed signal indicative of a speed of movement of row unit 106, and then determines when to independently actuate the different actuators 109 on row unit 106 so that material being applied through application assemblies 117 (and out distal tips 119 of application assemblies 117) will be applied at a desired location relative to the seed in trench or furrow 162 and/or based on other planting characteristics identified by processing the image(s) captured by optical seed sensor 122A. There can be a more than one seed sensor, seed sensors of different types, different locations for seed sensors, etc.

Figure 8:
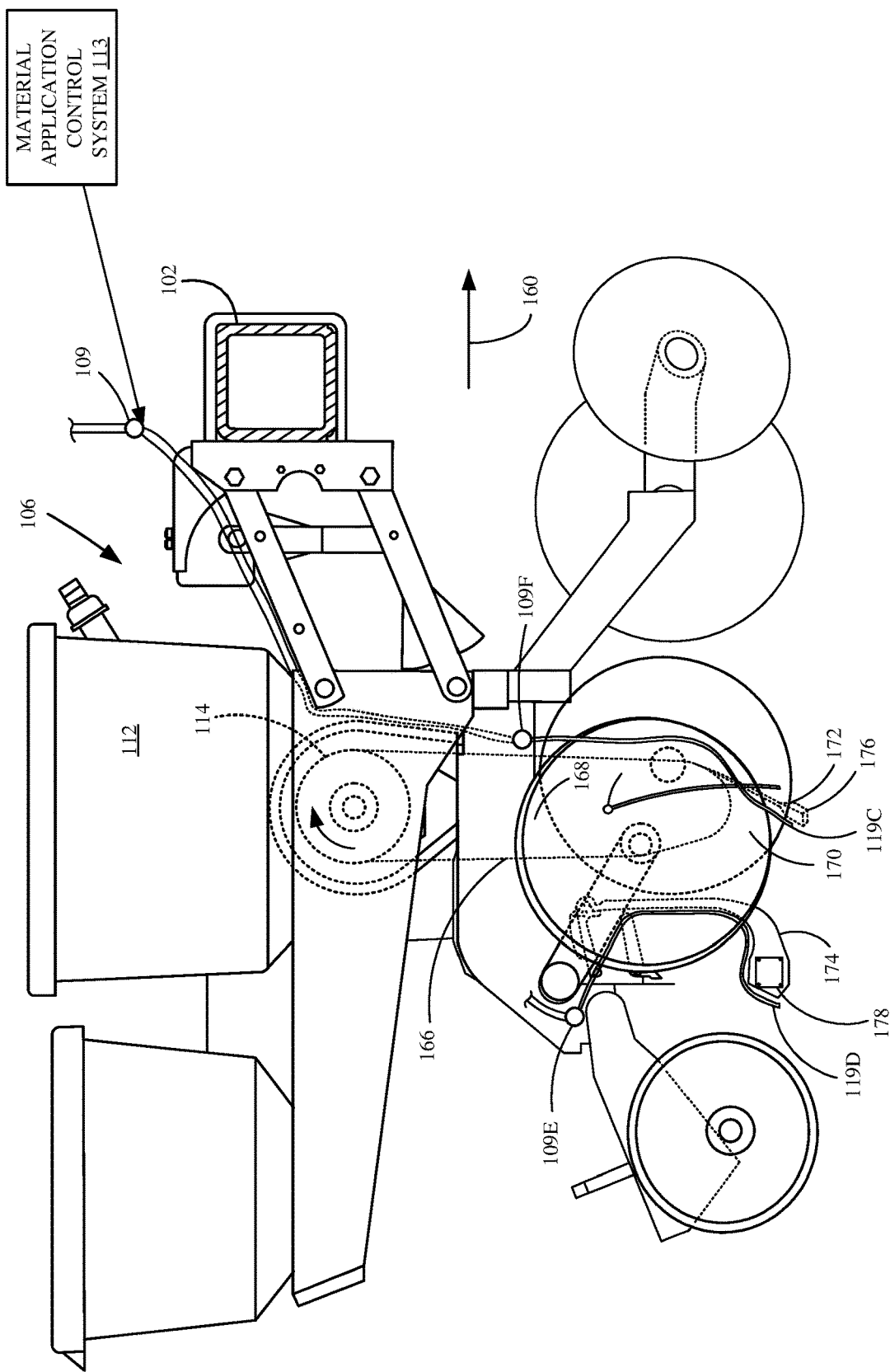
FIG. 8 is a side view showing another example of a row unit of the planting machine illustrated in FIG. 1.

FIG. 8 is similar to FIG. 7 and similar items are similarly numbered. However, in FIG. 8, row unit 106 is also provided with members 172 and/or 174. Members 172 and/or 174 can be spring biased into engagement with the soil, or rigidly attached to the frame of row unit 106. In one example, member 172 can be a furrow shaper, which contacts the soil in the area within or closely proximate the furrow, and immediately after the furrow is opened, but before the seed is placed therein. Member 172 can thus contact the side(s) of the furrow, the bottom of the furrow, an area adjacent the furrow, or other areas. It can be fitted with a sensor 176, e.g., seed sensor 176, as well.

In another example, member 172 can be positioned so that it moves through the furrow after the seed is placed in the furrow. In such an example, member 172 may act as a seed firmer, which firms the seed into its final seed location.

In either case, member 172 can include a seed sensor 122, which senses the presence of the seed. System 122 may be an optical sensor, which optically senses the seed presence as member 172 moves adjacent to, ahead of, or over the seed. Sensor 122 may be a mechanical sensor that senses the seed presence, or it may be another type of sensor that senses the presence of the seed in the furrow. Sensor 122 illustratively provides a signal to material application control system 113 indicating the presence of the sensed seed.

In such an example, it may be that the plurality of actuators 109 on the row unit 106 are placed at the location of actuator 109E, shown in FIG. 8, and the outlet end of the application assemblies corresponding to each actuator is shown at 119C. In the example shown in FIG. 8, outlet ends 119C can be located closely behind member 172 relative to the direction indicated by arrow 160. Outlet ends 119C can be disposed on the opposite side of member 172 as well (such as forward of member 172 in the direction indicated by arrow 160). In such an example, the seed sensor 122 senses the seed at a location that corresponds to its final seed location, or that is very closely proximate its final seed location. This may increase the accuracy with which seed sensor 122 senses the final seed location.

Also, in the example shown in FIG. 8, row unit 106 can have member 174 in addition to, or instead of, member 172. Member 174 can also be configured to engage the soil within, or closely proximate, the trench or furrow. Member 174 can have a seed sensor 122 that senses the presence of a seed (or a characteristic from which seed presence can be derived). Member 174 can be placed so that it closely follows the exit end 121 of the seed tube 120, or the exit end 170 of the assistive delivery system 166. Also, actuators 109 can be placed at the position illustrated at 109F.

Figure 9:
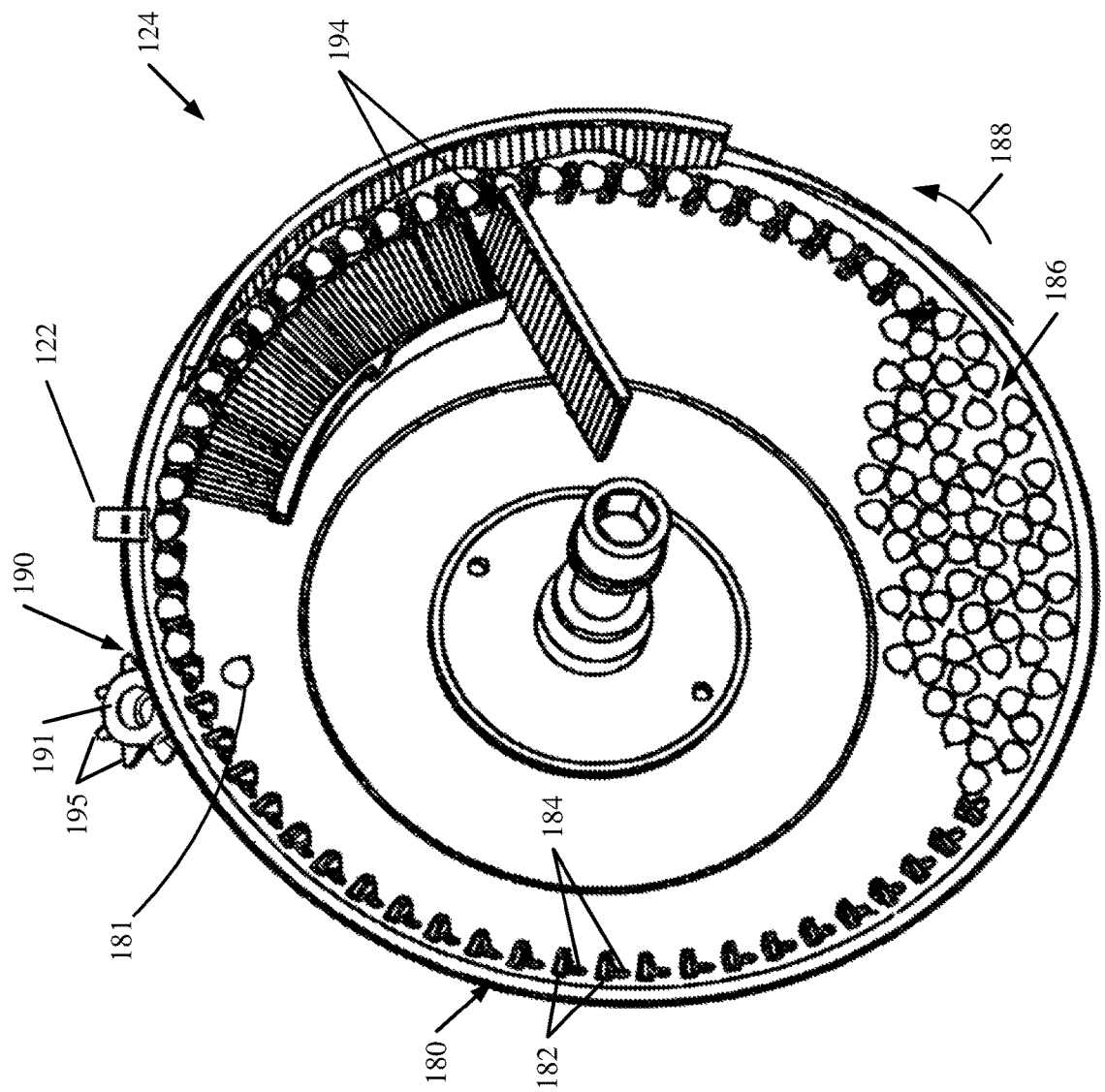
FIG. 9 is a perspective view of a portion of a seed metering system.

FIG. 9 shows one example of a rotatable mechanism that can be used as part of the seed metering system (or seed meter) 124. The rotatable mechanism includes a rotatable disc, or concave element, 180. Rotatable element 180 has a cover (not shown) and is rotatably mounted relative to the frame of the row unit 106. Rotatable element 180 is driven by a motor (not shown) and has a plurality of projections or tabs 182 that are closely proximate corresponding apertures 184. A seed pool 186 is disposed generally in a lower portion of an enclosure formed by rotating mechanism 180 and its corresponding cover. Rotatable element 180 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 122 can also illustratively be mounted adjacent to rotating element 180. Seed sensor 122 generates a signal indicative of seed presence and this may be used by system 113.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 181), the seed is illustratively moved by the seed tube 120, seed delivery system 166 (some examples of which are shown above in FIGS. 7-9 and below in FIGS. 10 and 11) to the furrow 162 in the ground.

Figure 10:
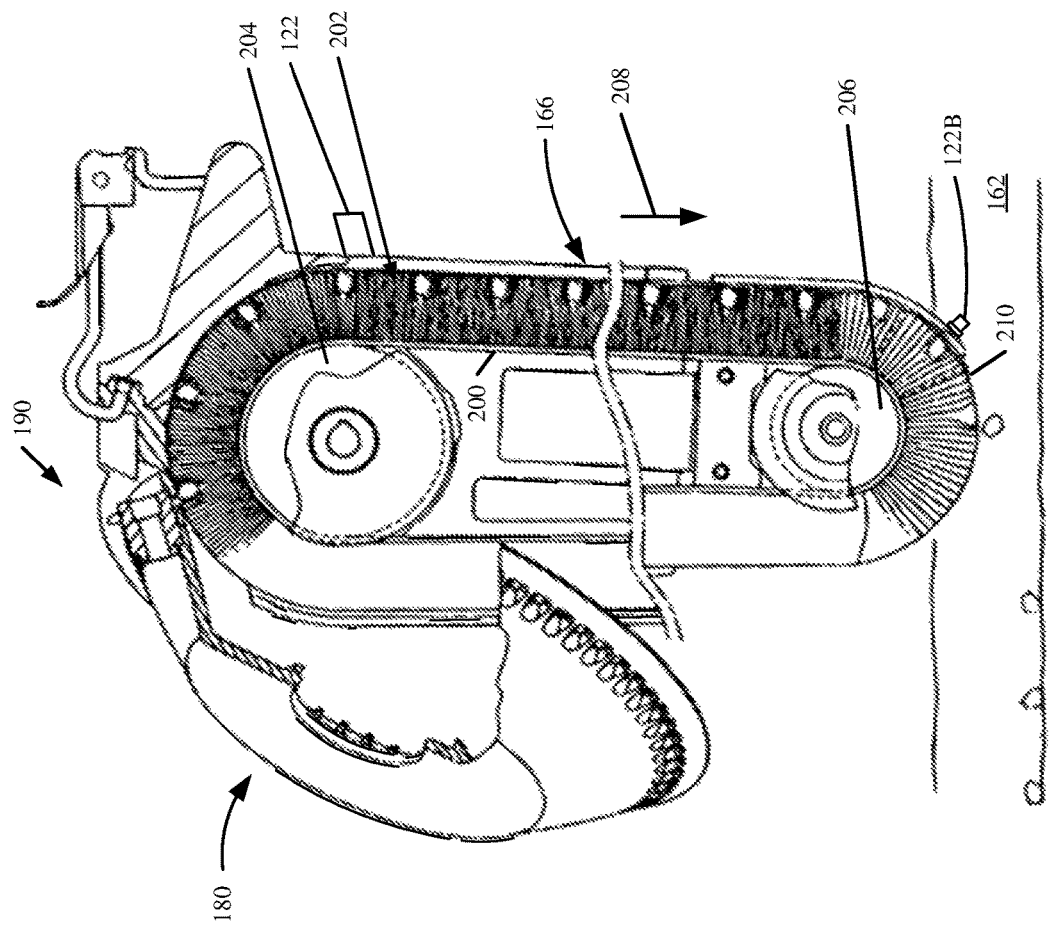
FIG. 10 shows an example of a seed delivery system that can be used with a seed metering system.

FIG. 10 shows an example of a seed metering system and a seed delivery system, in which the rotating element 180 is positioned so that its seed discharge area 190 is above, and closely proximate, seed delivery system 166. In the example shown in FIG. 10, seed delivery system 166 includes a transport mechanism such as a belt 200 with a brush that is formed of distally extending bristles 202 attached to belt 200 that act as a receiver for the seeds. Belt 200 is mounted about pulleys 204 and 206. One of pulleys 204 and 206 is illustratively a drive pulley while the other is illustratively an idler pulley. The drive pulley is illustratively rotatably driven by a conveyance motor, which can be an electric motor, a pneumatic motor, a hydraulic motor, etc. Belt 200 is driven generally in the direction indicated by arrow 208.

Therefore, when seeds are moved by rotating element 180 to the seed discharge area 190, where they are discharged from the seed cells in rotating element 180, they are illustratively positioned within the bristles 202 by the projections 182 that push the seed into the bristles 202. Seed delivery system 166 illustratively includes walls that form an enclosure around the bristles 202, so that, as the bristles 202 move in the direction indicated by arrow 208, the seeds are carried along with them from the seed discharge area 190 of the metering mechanism, to a discharge area 210 either at ground level, or below ground level within a trench or furrow 162 that is generated by the furrow opener 114 on the row unit 106.

Additionally, the seed sensor 122 is also illustratively coupled to seed delivery system 166. As the seeds are moved within bristles 202, sensor 122 can detect the presence or absence of a seed. It should also be noted that while the present description will proceed as having sensors 122 and/or 122A, it is expressly contemplated that, in another example, only one sensor is used. Or additional sensors can also be used. Similarly, the seed sensor 122, 122A shown in the FIGS. can be disposed at a different location, such as that shown at 122B. Having a seed sensor 122 closer to where the seed is ejected from the system can reduce error in identifying the final seed location. Again, there can be multiple seed sensors 122, 122A, different kinds of seed sensors, and they can be located at many different locations.

Figure 11:
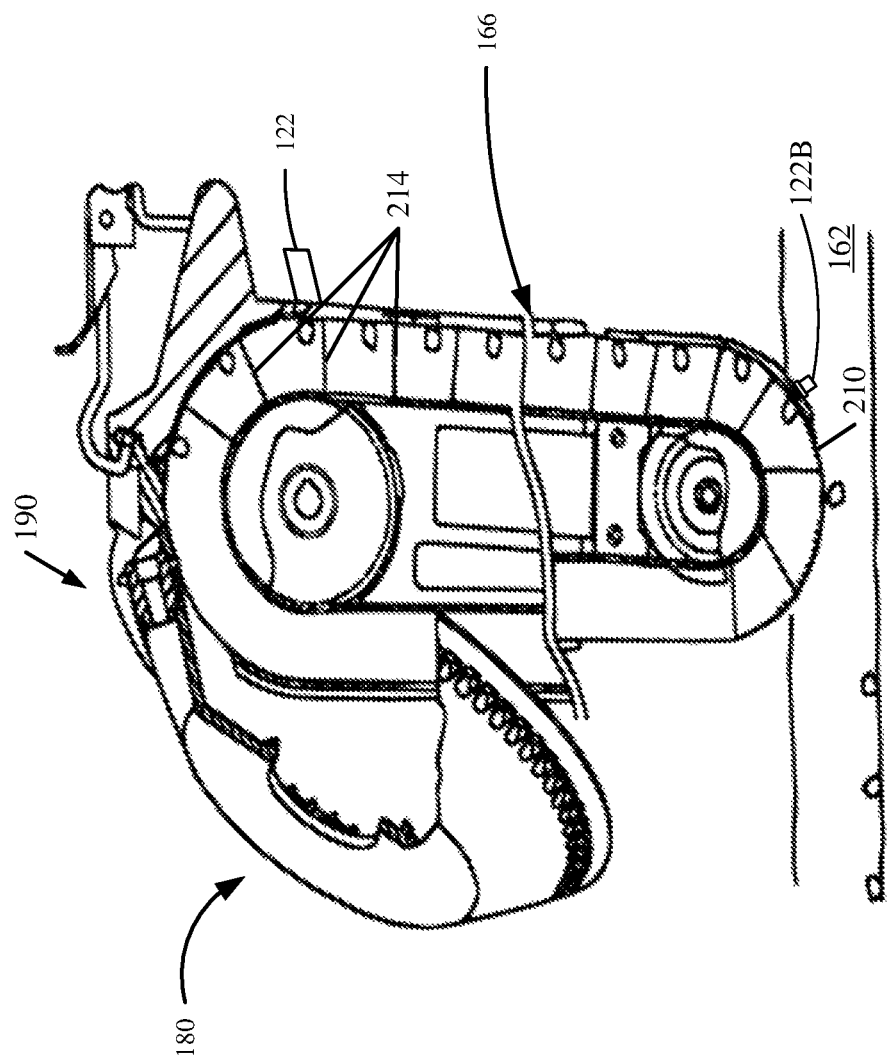
FIG. 11 shows another example of a delivery system that can be used with a seed metering system.

FIG. 11 is similar to FIG. 10, except that seed delivery system 166 does not include a belt with distally extending bristles. Instead, it includes a flighted belt (transport mechanism) in which an endless or continuous member (e.g., a belt) set of paddles 214 that form individual chambers (or receivers), into which the seeds are dropped, from the seed discharge area 190 of the metering mechanism. The flighted belt moves the seeds from the seed discharge area 190 to the exit end 210 of the flighted belt, within the trench or furrow 162.

There are a wide variety of other types of delivery systems as well, that include a transport mechanism and a receiver that receives a seed. For instance, delivery system can include dual belt delivery systems in which opposing belts receive, hold, and move seeds to the furrow, a rotatable wheel that has sprockets, which catch seeds from the metering system and move them to the furrow, multiple transport wheels that operate to transport the seed to the furrow, and an auger, among others. The present description will proceed with respect to an endless or continuous member (such as a brush belt, a flighted belt) and/or a seed tube, but many other delivery systems are contemplated herein as well.

Figure 12:
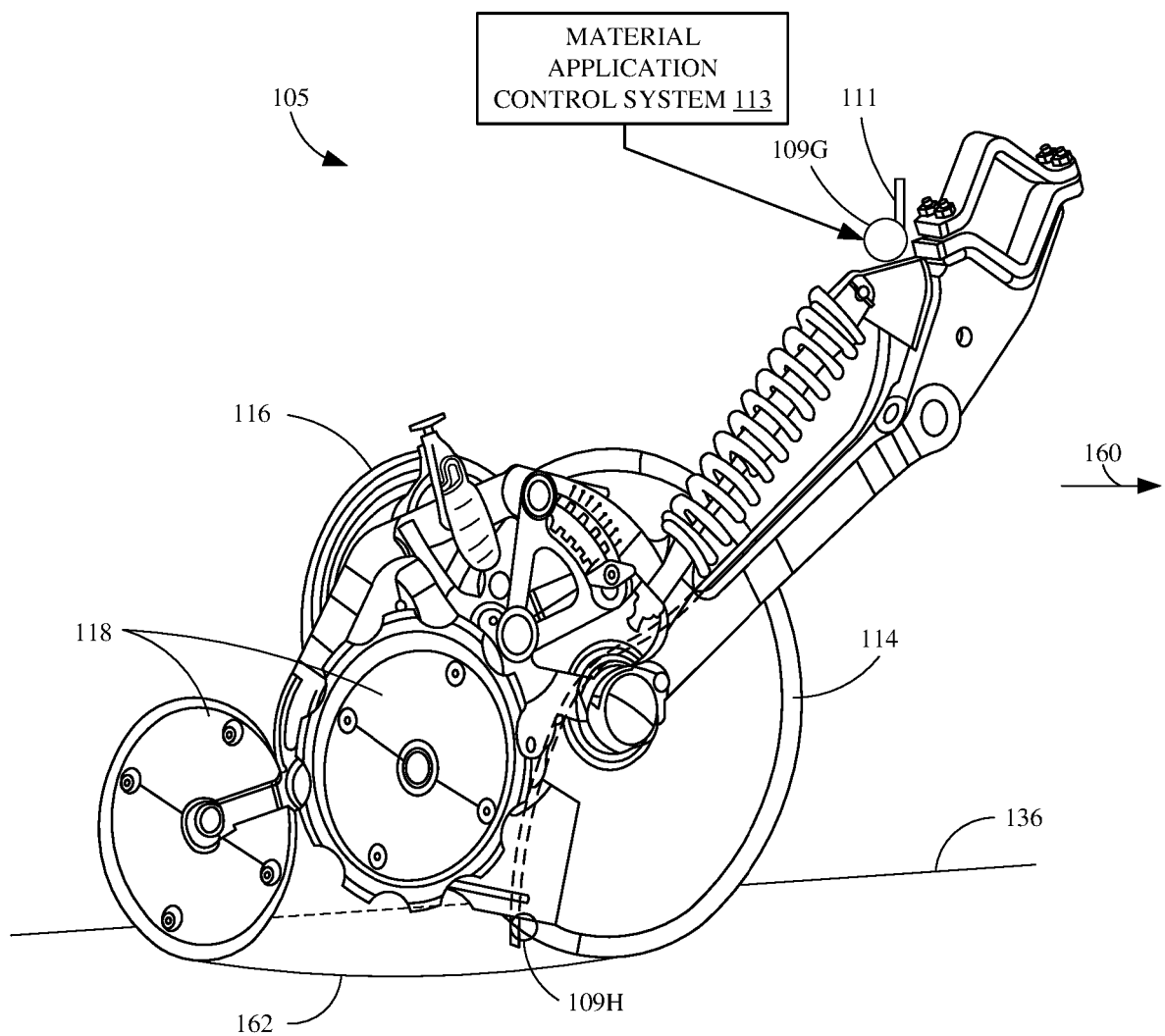
FIG. 12 is a view of an application unit.

FIG. 12 is a side perspective view of an applicator unit 105. Some items are similar to those shown in other FIGS. and they are similarly numbered. Briefly, in operation, applicator unit 105 attaches to a side-dress bar that is towed behind a towing vehicle 94, so unit 105 travels between rows (if the rows are already planted). However, instead of planting seeds, applicator unit 105 simply applies material at a location between rows of seeds (or, if the seeds are not yet planted, between locations where the rows will be, after planting). When traveling in the direction indicated by arrow 160, disc opener 114 (in this example, it is a single disc opener) opens furrow 162 in the ground 136, at a depth set by gauge wheel 116. Applicator unit 105 can have a plurality of independently controllable actuators 109. When actuators 109 are actuated, material is applied in the furrow 162 and closing wheels 118 then close the furrow 162.

As unit 105 moves, material application control system 113 controls actuators 109 to dispense material. This can be done relative to seed or plant locations, if they are sensed or are already known or have been estimated. Application can also be done before the seed or plant locations are known. In this latter scenario, the locations where the material is applied can be stored so that seeds can be planted later, relative to the locations of the material that has been already dispensed.

FIG. 12 shows that actuators 109 can be mounted to any of a plurality of different positions on unit 105. Two of the positions are shown at 109G and 109H. These are examples and the actuators 109 can be located elsewhere as well. Similarly, multiple actuators can be disposed on unit 105 at different locations, or adjacent one another, to dispense multiple different materials or to dispense material in a more rapid or more voluminous way Or to dispense the same material at different rates or according to different application patterns.

Before continuing with the description of applying material relative to seed location, a brief description of some examples of seed sensors 122, 122A will first be provided. Sensors 122, 122A are illustratively coupled to seed metering system 124, seed delivery system 120, 166 and/or at other locations. In one example, sensors 122, 122A are seed sensors that are mounted at a sensor location to sense a seed within seed tube 120, seed metering system 124, and delivery system 166, and/or in furrow 162, as the seed passes the respective sensor location. In one example, sensors 122, 122A are optical or reflective sensors and thus include a transmitter component and a receiver component. The transmitter component emits electromagnetic radiation into seed tube 120, seed metering system 180, into furrow 162, and/or delivery system 166. In the case of a reflective sensor, the receiver component then detects the reflected radiation and generates a signal indicative of the presence or absence of a seed adjacent to sensor 122, 122A based on the reflected radiation. With other sensors, radiation such as light is transmitted through the seed tube 120, seed metering system 124, and/or the delivery system 166. When the light beam is interrupted by a seed, the sensor signal varies, to indicate a seed. When the seed sensor 122, 122A is an image capture-type sensor, image processing is performed to identify seeds in a captured image and to, in one example, locate the seed in a global or local coordinate system (if the seed is in furrow 162, for instance). Thus, each sensor 122, 122A generate a seed sensor signal that pulses or otherwise varies, and the pulses or variations are indicative of the presence of a seed passing the sensor location proximate the sensor.

For example, in regards to sensor 122 shown in FIG. 10, bristles 202 pass sensor 203 and are colored to absorb a majority of the radiation emitted from the transmitter. As a result, absent a seed, reflected radiation received by the receiver is relatively low. Alternatively, when a seed passes the sensor location where sensor 122 is mounted, more of the emitted light is reflected off the seed and back to the receiver, indicating the presence of a seed. The differences in the reflected radiation allow for a determination to be made as to whether a seed is, in fact, present. Additionally, in other examples, sensors 122, 122A can include a camera and image processing logic that allow visual detection as to whether a seed is present within seed metering system 124, seed tube 120, furrow 162, and/or seed delivery system 166, at the sensor location proximate the sensor. The seed sensors 122, 122A can include a wide variety of other sensors (such as RADAR or LIDAR sensors) as well.

For instance, where a seed sensor is placed on a seed firmer, it may be a mechanical or other type of sensor that senses contact with the seed as the sensor passes over the seed. Also, while the speed of the seed in the delivery system (or as it is ejected) can be identified by using a sensor that detects the speed of the delivery system, in some examples, the speed and/or other characteristics of movement of the seed can be identified using seed sensors. For instance, one or more seed sensors can be located to sense the speed of movement of the seed, its trajectory or path, its instantaneous acceleration, its presence, etc. This can be helpful in scenarios in which the seed delivery system changes speed.

Figure 13:
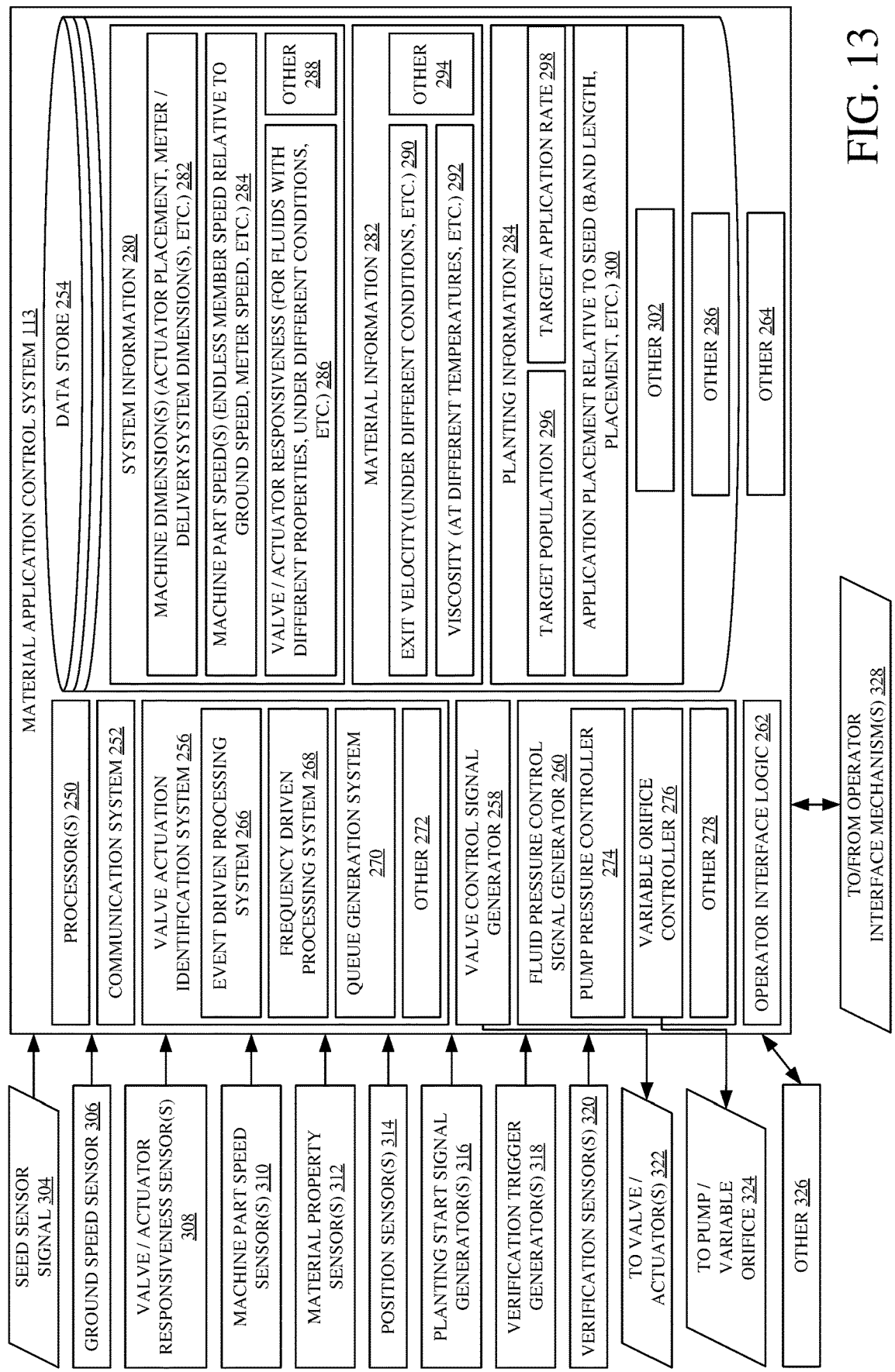
FIG. 13 is a block diagram showing one example of a material application control system.

FIG. 13 is a block diagram showing one example of material application control system 113 in more detail. In the example, it is assumed that actuators 109 are valves and that the material to be applied is pumped to actuators 109 by pump 115. Of course, this is just one example and actuators 109 could be pumps or nozzles or other actuators as well. In the example shown in FIG. 13, system 113 illustratively includes one or more processors 250, communication system 252, data store 254, valve actuation identification system 256, valve control signal generator 258, fluid pressure control signal generator 260, operator interface logic 262, and system 113 can include a wide variety of other items 264. FIG. 13 also shows that valve actuation identification system 256 can include event driven processing system 266 and/or frequency driven processing system 268. System 256 illustratively includes queue generation system 270, and it can include a wide variety of other items 272. Fluid pressure control signal generator 260 illustratively includes pump pressure controller 274 and/or variable orifice controller 276. Generator 260 can include other items 278 as well.

Data store 254 can include a wide variety of different types of information. The information can be pre-configured or pre-programmed into data store 254, or the information can be sensed by sensors and stored in data store 254 intermittently (such as periodically, or the information can be regularly updated based on those sensor inputs). By way of example, data store 254 illustratively includes system information 280, material information 282, planting information 284, and can include a wide variety of other information 286. System information 280 illustratively includes information about the planter 100, the delivery system 120, 166, and/or other items that are used to plant seed. System information 280 includes information that can be used to identify when to apply material relative to the seed location of a seed in furrow 162 by each of a plurality of different independently controllable actuators (e.g., 109-1 and 109-2) on each row unit 106. Therefore, system information 280 can include information that allows valve actuation identification system 256 to identify a timing of when the valves 109 should be opened to apply the material, relative to the seed location.

As examples, system information 280 can include machine dimensions 282. These dimensions can include dimensions that indicate where each valve 109 is placed relative to the outlet opening of the seed delivery system. System information 280 can include dimensional information indicating where each valve 109 is placed relative to the seed sensor 122, 122A. Information 280 can include information such as the size, e.g., one or more dimensions, of the seed delivery system 120, 166, so that the distance between the seed sensor and the furrow 162 can be identified. Information 280 can include a wide variety of other machine dimension information 282 as well.

System information 280 can also include machine part speed information 284. This information can include the speed of an endless member used to deliver seed (such as the brush belt 200 delivery system or the flighted belt 214 delivery system). Where the speed of those mechanisms changes with the ground speed of the planter, information 284 can identify the different belt speeds relative to this sensed ground speed or provide a correlation so the belt speed can be calculated given the ground speed. Speed information 284 can include other machine part speed information as well such as the speed of metering system 124, etc.

System information 280 also illustratively includes valve/actuator responsiveness information 286. Information 286 can indicate the responsiveness of the actuators 109 that are being used to apply material. In one example, an actuator 109 may be a solenoid valve so that there is a latency between when a valve open signal is applied and when the solenoid actually opens the valve. The same is true for closing the valve. That is, there may be a latency between when the valve close signal is applied and when the valve actually closes. In addition, the actuator responsiveness may change based upon the particular properties of the material that is flowing through the valve. The actuator responsiveness may change based upon the type of nozzle or other actuator that is being used, and the responsiveness may change under different ambient conditions (e.g., it may take longer to cycle when the weather is cold than when the weather is warm, etc.). The valve/actuator responsiveness information 286 can indicate valve responsiveness given these and other types of information. System information 280 can include a wide variety of other information 288, as well.

Material information 282 illustratively identifies properties of the material that is being applied by the system. For instance, material information 282 may include exit velocity information 290 that identifies a velocity at which the material exits the valve or actuator or nozzle 109 that is being used to apply it. Again, the exit velocity of the material may change based on the material, or under different conditions, and the exit velocity information 290 may indicate this as well.

Where the material is a liquid material, then material information 282 may also include viscosity information 292, which identifies the viscosity or other liquid properties of the material. The viscosity may change at different temperatures or under other circumstances, and viscosity information 292 will illustratively indicate this. Where the row unit 106 is applying multiple different types of material, then there is illustratively a set of material information 282 for each different type of material being applied. The material information 282 can include a wide variety of other information 294 indicative of other properties of the material being applied.

Planting information 284 can include a wide variety of different types of information indicative of the planting operation. For example, information 284 can include target population information 296 that identifies a target seed population. Information 284 can include target application rate information 298 that indicates a target application rate for the material being applied. Information 284 can include application placement relative to seed information 300 that indicates placement properties of the application, or application pattern, for the material. For instance, where the material is liquid material and is being applied in a band of liquid, it May indicate the length of each application band to be applied by the valve or actuator. Information 284 may indicate a placement of that band relative to the seed location. For instance, where the band is to be four inches long, the placement information may indicate a relative placement of the center of the band (along its longitudinal length) relative to seed location. In this way, where the material is to be applied at the seed location, then the center of the band will illustratively correspond to the seed location. However, where the material is to be applied at a location other than the seed location, then the center of the band will illustratively be offset from the seed location by a desired amount. Similarly, the application rate may vary within an application band. For instance, the material may be applied more heavily near the center of the band than at either end of the band or vice versa. This type of information can be included in information 300. Similarly, information 284 can indicate placement of material relative to seed location, rate of application, or other information for a plurality of different materials being applied by a plurality of different actuators 109 on a single row unit 106, or for the same material being applied using a different application pattern using the plurality of different actuators 109. The planting information 284 can include a wide variety of other information 302, indicative of the planting operation, as well.

FIG. 13 also shows that material application control system 113 illustratively receives one or more seed sensor signals 304 that may be generated from one or more of seed sensors 122, 122A, or another seed sensor located at a different location. Seed sensor signal 304 may illustratively indicate when the particular seed sensor senses the presence of a seed.

FIG. 13 also shows that, in one example, system 113 includes an input from ground speed sensor 306, which senses the ground speed of row unit 106. The sensor 306 may be located on the towing vehicle or elsewhere, and illustratively provides a sensor signal indicative of ground speed.

As discussed above, some of the information stored in data store 254 may be pre-configured or pre-defined. In another example, the information may be sensed by various sensors. Therefore, in one example, system 113 receives the valve/actuator responsiveness information 286 from a valve/actuator responsiveness sensor 308. Sensor 308 may illustratively sense the movement of a solenoid, or other actuator, to sense how responsive the actuator or valve is to the control signals that are applied to it. Thus, it may provide a signal indicative of the latency between applying a valve open signal (or pump on signal) and when the valve actually opens (or the pump turns on), and indicative of latency between applying a valve close signal (or pump off signal) and when the valve actually close (or the pump turns off), among other things.

The machine part speeds information 284 may also be pre-defined or sensed by machine part speed sensors 310. Those sensors 310 may illustratively sense the speed at which the seed delivery system 166 is moving, the speed at which the seed metering system 124 is moving, or the speed of a wide variety of other machine parts that are needed to generate the actuator signals used to apply material, as desired.

Similarly, the material information 282 can be pre-defined or sensed by material property sensors 312. Those sensors 312 may sense such things as material temperature, material viscosity, among other things.

System 113 can also receive an input from a position sensor 314. Position sensor may include a GPS system, another global navigation satellite system (GNSS), a cellular triangulation system, a dead reckoning system, or another type of position system that provides a signal indicative of the position of the sensor 314 in a global or local coordinate system. Such a sensor can also be used to derive other information such as machine heading, to determine ground speed, among other things.

System 113 also illustratively receives an input from a planting start signal generator 316. Generator 316 can generate its output based on any of a wide variety of different signals from any of a wide variety of different sensors, actuators or control inputs, indicating that the planting operation has begun. For instance, it may be that the operator 92 of the towing vehicle 94 depresses a button or provides another input through a user interface mechanism 96 to start the planting operation. This input may be sensed by signal generator 316 and used to generate a signal indicating that the planting operation has begun. In another example, generator 316 may include a sensor indicating that either metering system 124 or seed delivery system 166 has begun moving. In another example, generator 316 may include a sensor indicating that a seed has passed the sensors 122, 122A. Generator 316 may generate a signal based on these inputs, which is indicative of the planting operation beginning.

System 113 can also receive an input from verification trigger generator 318. Generator 318 provides an input, under certain circumstances, which are described in greater detail elsewhere herein, indicating when system 113 is to perform a verification operation, especially where frequency driven processing system 268 is used.

When a verification operation is to be performed, signals may be received by system 113 from a variety of different verification sensors 320. Examples of these sensors are described elsewhere herein.

Valve control signal generator 258 illustratively generates control signals 322 that are sent and/or applied to the valves or actuators 109 in order to apply the material. Control signals 322 can be sent to independently control the multiple different actuators 109 on each row unit 106. This is also described in greater detail elsewhere herein.

In some examples, the material being applied is a solid or granular material and/or a liquid that is provided by fluid under pressure by pump 115. In that case, the pump displacement may be controlled to control the pressure. Similarly, the valves or nozzles may be provided with a variable orifice. When material includes liquid, the variable orifice may be controlled as well. Therefore, fluid pressure control signal generator 260 illustratively generates outputs 324 that illustratively control the pump and/or variable orifice, in those scenarios. In a scenario in which actuators 109 are pumps, outputs 324 can control those pumps as well. In a scenario in which the material is granular, actuator 109 can be dispensers that meter and dispense the granular material and outputs 324 control those meters and/or dispensers.

System 113 can include a wide variety of other inputs and system 113 can generate a wide variety of other outputs as well, as indicated by block 326.

FIG. 13 also shows that, in one example, operator interface logic 262 may generate signals that are output to operator interface mechanisms 96, and logic 262 can receive information from those mechanisms as well, as indicated by block 328.

Before describing the overall operation of material application control system 113, a brief description of some of the items in system 113 will first be provided. Communication system 252 can be any of a wide variety of different types of communication systems that allow material application control system 113 to communicate with a control system on towing vehicle 94 and/or operator interface mechanisms 96. Communication system 252 can also allow items on system 113 to communicate with one another, and to communicate with one or more different remote computing systems. Therefore, for instance, communication system 252 can include a controller area network-CAN-bus and bus controller, a local area network, a wide area network, a near field communication system, a cellular communication system, a Wi-Fi system, Bluetooth system, and/or any of a wide variety of other networks or combinations of networks and communication systems.

Valve actuation identification system 256 illustratively receives some of the inputs discussed above and identifies when the valves 109 are to be actuated in order to apply material at a desired location relative to the location of the seeds being placed in furrow 162. System 256 can identify when the multiple, independently controllable actuators 109 on each row unit 106 are to be actuated so each actuator 109 can dispense or apply material according to a different application pattern. In one example, system 256 includes event driven processing system 266, which determines when the valves 109 are to be actuated based on an event, such as based upon receiving an indication from seed sensor signal 304 that a seed has been sensed. For instance, referring to FIG. 7, assume that seed sensor 122 detects a seed in delivery system 166. Event driven processing system 266 calculates a time that it will take that seed to travel to the outlet end 170 of delivery system 166, based upon the speed of delivery system 166, as indicated by machine part speed sensors 310. System 266 then calculates a time delay, during which the seed will move from the outlet end 170 of the seed delivery system 166 to its final resting place is furrow 162. Then, based upon the location of the multiple actuators 109 on row unit 106, the valve/actuator responsiveness, the exit velocity or viscosity of the material(s) being applied, the ground speed of row unit 106, and based upon the desired placement of the material(s) relative to the seed location (as indicated by the corresponding information in data store 254 or based on the inputs from the sensors discussed above), event driven processing system 266 calculates when each of the valves 109 should be actuated in order to apply the material(s) at the desired place, relative to the seed location. In one example, one actuator 109-1 can be controlled to continuously apply a material to furrow 162 at a continuous or varying rate and another actuator 109-2 can be controlled to apply material (the same or different material as applied by actuator 109-1) intermittently such as at seed locations or between seed location or to the side of seed locations, etc.

In another example, valve actuation identification system 256 can include frequency driven processing system 268. Frequency driven processing system 268 need not necessarily receive an input from a seed sensor, but instead is a controlled system, e.g., a highly 17 controlled system, that knows the speeds of the various parts of row unit 106, the valve placement on row unit 106, valve responsiveness, and the material properties. Therefore, frequency driven processing system 268 knows, before planting, when seeds will be placed in the furrow 162, and thus when to actuate the actuators 109. In such a tightly controlled system, frequency driven processing system 268 simply needs to know when the planting operation begins, e.g., when the first seed is deposited into the furrow 162. System 268 can then calculate the theoretical time when seeds will be deposited in the furrow 162, and thus when to actuate each of the actuators 109 to apply the material(s) at the desired location relative to the seeds. Therefore, in that scenario, system 268 receives a signal from planting start signal generator 316, which is indicative of when the planting operation begins. Based on that information, frequency driven processing system 268 calculates when the valves 109 are to be actuated and provides an indication of that to valve control signal generator 258, which generates the corresponding valve control signals.

Also, in one example, it may be that frequency driven processing system 268 occasionally verifies that it is actuating the valves according to the correct pattern, e.g., that the timing calculated by the system 268 aligns properly with the deposition of seeds into the furrow 162 (relative to the seeds in the furrow 162). In that case, frequency driven processing system 268 may intermittently receive an input from seed sensor signal 304 identifying where an actual seed was sensed. It can then determine whether the prior pattern it is using to actuate actuators 109 is correct based upon the actual seed sensor signal. In some examples, the frequency driven processing system 268 uses a periodically sensed single seed (e.g., the seed sensor signal 304 identifies and reports a single seed in one or more of space and time). In some examples, the frequency driven processing system 268 uses a periodically sensed multiple seeds (e.g., the seed sensor signal 304 identifies and reports multiple seeds, such as strings of two seeds, three seeds four seeds five seeds, six seeds, or any other number of seeds necessary or helpful to the frequency driven processing system 268). In some examples, the frequency of verification by the frequency driven processing system 268 is loosely inversely related to the number of seeds reported by the seed sensor signal 304. For example, verification may occur more frequently when only a single seed is sensed and reported, whereas verification may occur less frequently when two or more seeds are sensed and reported. If a correction is needed, then system 268 can make that correction to the pattern it is using, and use the corrected pattern going forward. The frequency driven processing system 268 can intermittently re-verify that pattern as well.

Thus, in one example, frequency driven processing system 268 receives an input from verification trigger generator 318 indicating that a verification operation is to be performed. The triggers can include one or more of a wide variety of different triggers (the system may be initiated by a single trigger or it may be initiated when only two or more triggers are received). For instance, the system may be triggered to verify its prior pattern after a certain number of seeds have been planted (the number of seeds may be identified substantially exactly using a seed sensor, or the number of seeds may be estimated or calculated using system inputs, such as, but not limited to, seed population and prime mover travel speed). The system 268 may be triggered after a certain distance has been traveled by row unit 106 (as mentioned, the triggering distance may vary based on the set seed population, e.g., a higher seed population may trigger the system after a shorter distance than a lower seed population). System 268 may be triggered after a specific time has elapsed. These are just examples of triggers. Once the verification operation has been triggered, then frequency driven processing system 268 may receive other sensor signal inputs from verification sensors 320, that are used to verify the pattern that system 268 is using to apply the material. Some of these are discussed in greater detail elsewhere herein.

In another example, queue generation system 270 generates a set of valve actuation timing signals, indicating when each of the actuators 109 should be actuated, for a future sequence of actuations. For instance, queue generation system 270 may generate a queue of timing signals that are generated either by event driven processing system 266 or frequency driven processing system 268, and provide that plurality of queued timing signals to valve control signal generator 258. Valve control signal generator 258 can receive that set of signals and generate valve actuator control signals based upon the queued sequence of timing signals. In this way, the network bandwidth for communication between valve actuation identification system 256 and valve control signal generator 258 need not be as high. By communicating a plurality of valve actuation timing signals as a queued sequence of signals, the frequency with which those signals need to be sent can be greatly reduced over an implementation in which each valve actuation timing signal is sent, individually and separately, for each valve actuation.

Valve control signal generator 258 can generate the valve control signals in a wide variety of different ways. Generator 258 can generate those signals and apply them through a hardware wiring harness, through wireless communication, or in other ways.

In some examples, the fluid pressure of the material to be applied is to be controlled. For instance, by increasing the fluid pressure, this may increase the exit velocity of the material as it is applied by the actuator (e.g., valve or nozzle) 109 being controlled. Similarly, where the actuator (e.g., valve or nozzle) 109 is not directed vertically, but has a horizontal component to its orientation, increasing the fluid pressure may change the trajectory of the fluid after it exits the actuator (e.g., valve or nozzle) 109. This will change the location on the ground where the material is applied.

In the same way, where the valve or nozzle is provided with a variable orifice, varying the orifice may change the trajectory or exit velocity of the material as well. Thus, pump pressure controller 274 can control the pump pressure to obtain a desired exit velocity and/or trajectory of the material being applied. Variable orifice controller 276 can variably control the orifice to also achieve a desired exit velocity and/or trajectory of the applied material. In some examples, variable orifice controller 276 and pump pressure controller 274 can work in concert to control the exit velocity and/or trajectory of the material being applied.

Operator interface logic 262 can generate information that is provided to operator interface mechanisms 96 so that operator 92 can interact with that information. Similarly, operator interface logic 262 can receive information indicative of operator inputs from operator 92 through operator interface mechanisms 96. Logic 262 can communicate that information to the various items or components on/of material application control system 113.

Figure 14:
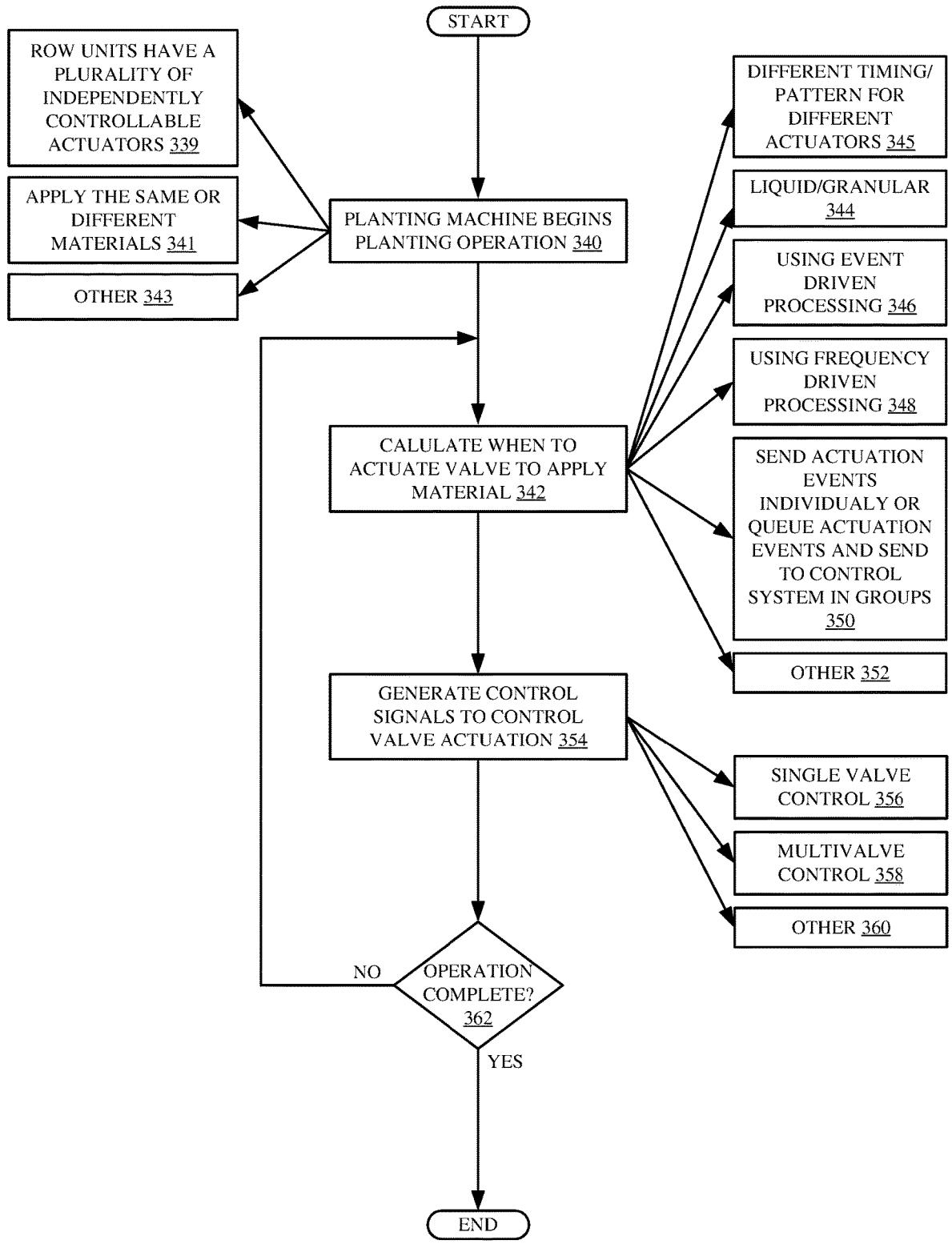
FIG. 14 is a flow diagram illustrating one example of the operation of the material application control system shown in FIG. 13.

FIG. 14 is a flow diagram illustrating one example of the overall operation of material application control system 113. It is first assumed that the planting machine (e.g., row unit 106) begins the planting operation. This is indicated by block 340 in the flow diagram of FIG. 9. Also, it is assumed that there are a plurality of independently actuatable actuators 109 on each row unit 106, as indicated by block 339. Actuators 109 can be actuated to apply the same material or different materials as indicated by block 341. The planting machine can operate in other ways or be configured in other ways as well, as indicated by block 343.

Based upon the various inputs, valve actuation identification system 256 calculates when to actuate the valves or actuators to apply the material relative to the seed location in the furrow 162, as indicated by block 342. The different actuators 109 on each row unit 106 can be controlled to apply material at different times, using different application patterns, as indicated by block 345. In one example, the material can be liquid or a granular, as indicated by block 344. In one example, system 256 can determine when to actuate the actuators 109 using event driven processing system 266, as indicated by block 346 in the flow diagram of FIG. 14. In another example, system 256 can determine when the actuators 109 are to be actuated using frequency driven processing system 268, as indicated by block 348. In one example, frequency driven processing system 268 can be used in conjunction with event driven processing system 266. Further, the timing indicators, indicating when the actuators 109 are to be actuated, may be sent individually or they may be grouped together by queue generation system 278 and sent, as groups, to valve control signal generator 258. Sending them individually or queuing the actuation events and sending them to valve control signal generator 258, in groups, is indicated by block 350 in the flow diagram of FIG. 14. Valve actuation identification system 256 can identify when the valves are to be actuated and output an indication of that to valve control signal generator 258, in other ways as well, as indicated by block 352 in the flow diagram of FIG. 14.

Valve control signal generator 258 then generates control signals to control valve (or other actuator) actuation, based upon the output from valve actuation identification system 256. The control signals control actuators 109 so that the material being applied by each actuator 109 is applied at the desired location in the furrow, e.g., relative to the seed location. Generating control signals to control valve actuation is indicated by block 354 in the flow diagram of FIG. 14.

In one example, there is a single actuator that controls a single nozzle, per row being planted. Controlling a single actuator is indicated by block 356. In another example, it may be that the nozzles or valves do not have a high enough bandwidth, e.g., max operating frequency, in order to apply the material at the desired frequency, or multiple different materials are being applied or material is to be applied using a plurality of different application patterns. In that case, there are multiple actuators per row being planted that can be controlled in order to achieve a desired application. These same types of configurations can be used when actuators 109 are pumps, controllable nozzles, or other actuators instead of valves.

For example, the seed population (e.g., seeds/acre) and row spacing are used to determine the seed-to-seed spacing in the furrow 162. This spacing, and the travel speed of planter 100, can be used to identify how quickly a valve is to respond in order to administer per-seed application (e.g., on each seed or between adjacent seeds/grains). A target seed rate of, for instance, 36,000 seeds/acre, with the planter traveling at 10 mph and with a thirty-inch row spacing, means that a nozzle on the planter will pass thirty seeds per second, or one seed every thirty three milliseconds. Some current fertilizer valves operate at about 10-15 Hz. Additionally, the opening time and closing time for some current valves can be approximately 7-8 milliseconds. This is often not fast enough to place fertilizer (or other material) on a per seed basis. Thus, the present system can have two or more actuators 109 (e.g., solenoids or other valves) per row operating out of phase (e.g., evenly out of phase) with one another to increase the overall frequency with which material can be applied in a row. While one valve is closing, another can be opening. Each valve can have its own nozzle or multiple valves can share a nozzle or multiple valves can provide material to multiple nozzles. These multiple valves per row can be placed proximate one another in the valve locations identified above in previous FIGS. or elsewhere. They can be controlled using control signals timed as described herein for a single valve, except that the valve control signals can be spread across the multiple valves to obtain the desired material application rate, timing and placement.

Further, it may be desirable to apply multiple different materials per row. In that case, there may be multiple different valves, per row, each dispensing a different material. Similarly, there may be multiple actuators 109 used per row unit 106 to apply one material and one or more additional actuators 109 used per row unit 106 to apply one or more other materials. Thus, valve actuation identification system 256 can provide an indication as to when to actuate each of the valves or other actuators 109 to apply the corresponding material, so that it is applied at the desired location relative to the seed, and valve control signal generator 258 generates control signals for the different valves, or actuators 109 based upon the output from system 256. For example, one valve or valve set may apply a first commodity directly to the seed while another valve or valve set may apply a second commodity, e.g., a hot commodity, between seeds or continuously in the furrow 162. Controlling multiple valves per row is indicated by block 358. Valve control signal generator 258 can generate control signals to control the valves in a wide variety of other ways as well, and this is indicated by block 360.

This continues until the planting operation is complete, as indicated by block 362 in the flow diagram of FIG. 14.

Figure 15:
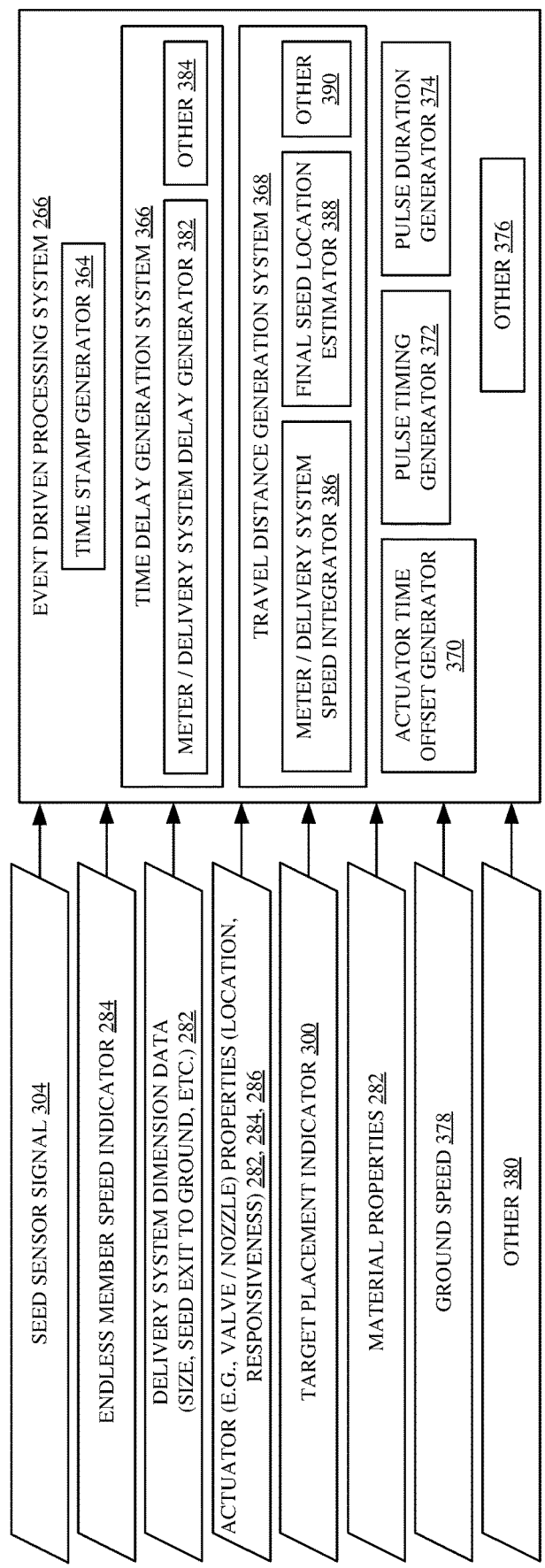
FIG. 15 is a block diagram showing one example of an event driven processing system.

FIG. 15 is a block diagram showing one example of event driven processing system 266, in more detail. System 266 illustratively includes time stamp generator 364, time delay generation system 366, travel distance generation system 368, actuator time offset generator 370, pulse timing generator 372, pulse duration generator 374, and it can include a wide variety of other items 376. FIG. 15 also shows that, in one example, event driven processing system 266 receives the one or more seed sensor signals 304, and endless member speed indicator 284 that indicates the speed of the delivery system 166 and/or meter 124, delivery system and meter dimension data 282 that indicates such things as the meter and/or delivery system size, the distance that the seed will drop after it exits the delivery system to the furrow, etc. System 266 receives actuator properties (such as valve location and responsiveness). This corresponds to the information 282, 284, and 286 discussed above. System 266 can receive target placement indicator 300, that identifies where the material is to be applied, e.g., relative to the seed in the furrow. System 266 can receive the material properties 282. System 266 can also receive an input indicative of ground speed 378. This can come from ground speed sensor 306 (discussed with respect to FIG. 13) or elsewhere. System 266 can receive a wide variety of other information 380 as well. As discussed above, the inputs to event driven processing system 266 can include information from data store 254 or from various different sensors, or from a combination of those things.

Time stamp generator 364 illustratively receives seed sensor signal 304 and generates a time stamp indicating when signal 304 indicates the presence of a seed. Time delay generation system 366 then generates a time delay indicative of the amount of time it will take the seed to travel from the particular seed sensor that sensed it, to an outlet opening of the seed delivery system 166 or seed tube 120. For instance, meter/delivery system delay generator 382 illustratively calculates the amount of time it will take the seed to travel from wherever it was sensed (meter 124, seed delivery system 120 or 166, or elsewhere) to the exit end of the seed delivery system, based upon the type of seed delivery system, the type of meter, etc. Where the seed is sensed in the seed meter 124, generator 382 obtains the speed of the seed meter and the speed of the delivery system 166, along with the size of both (e.g., the distance the seed must travel at the two different speeds) to identify a time when the seed will exit the seed delivery system. If the seed delivery system 166 is a seed tube 120, then the travel time through the seed tube will correspond, at least partially, to the acceleration of gravity, as the seed passes through the seed tube (other factors May impact the calculation, such as the forward travel speed of the row unit 106 and the coefficient of friction of both the seed and the inner surface(s) of the seed tube, among others). If the delivery system 166 is an assistive system, then the time will include the delay of that system in moving the seed from wherever it was sensed, to the outlet end of the delivery system. This may be based on the speed of an endless member, the velocity of a pneumatic assistance system, etc. If the seed sensor is located closer proximate the outlet end of the delivery system, then the time calculated by meter/delivery system delay generator 382 will be less, because the seed will be detected closer to the exit end of the delivery system. Depending on the response time of the valves 109, a seed sensor may be located as close as possible to the outlet end of the delivery system (or elsewhere, such as on a seed firmer) to minimize, if not eliminate, the time calculated by meter/delivery system delay generator 382. System 366 can include other items 384 as well.

In the example where time delay generation system 366 identifies the time delay, then actuator time offset generator 370 illustratively calculates a time offset corresponding to the responsiveness of the actuator being controlled, under the current conditions. For instance, the responsiveness may vary based upon the particular valve or actuator, based on the properties of the material being applied, based upon the ambient conditions, based on the pump pressure, or based on other things. Actuator time offset generator 370 generates an output indicative of a time offset that corresponds to a latency in actuation of the actuator.

Pulse timing generator 372 then generates a timing output indicative of a time when the valve should be actuated, based upon the time delay generated by meter/delivery system delay generator 382 and the offset generated by actuator time offset generator 370. In short, meter/delivery system delay generator 382 calculates the amount of time it will take for the seed to move from where it was sensed to its final seed location in furrow 162, and actuator time offset generator 370 will calculate how long it will take to begin applying the material, based upon the properties of the valve or actuator, once the valve actuation control signal is applied. Pulse timing generator 372 then generates a time when the actuator control signal should be applied to the valve/actuator, based upon the delay time generated by generator 382 and the offset generated by generator 370, and based upon the time stamp generated by time stamp generator 364.

Pulse duration generator 374 generates an output indicative of how long the actuator should stay on, e.g., open. This can include determining the latency in the actuator response between the time that it is commanded to close and when it actually closes. This May vary based upon the type of material being applied, based upon ambient conditions, etc. The two timing signals (the pulse time indicating when the actuator should be actuated, and generated by generator 372, and the pulse duration output by pulse duration generator 374) are provided to valve control signal generator 258. Valve control signal generator 258 generates valve control signals to actuate the valves (or other actuators) at the time indicated by pulse timing generator 372, and to keep the actuator actuated for a duration indicated by pulse duration generator 374. The rate at which the material is applied can also be varied. For example, the valve may be a proportional valve so more or less material can be applied.

In another example, where the seed metering system or delivery system changes speeds during planting, instead of using time delay generation system 366 (or in addition to it), event driven processing system 266 can include travel distance generation system 368. Instead of calculating the time that will be needed to move the seed from the location where it was sensed, e.g., in the meter or the seed delivery system, into the furrow, meter/delivery system speed integrator 386 can integrate acceleration (that arises from changes in velocity) to obtain the velocity of the system and it can then integrate the velocity to obtain a signal indicative of the location of the seed (or the distance it has traveled) to determine when the seed exits the seed delivery system, and final seed location estimator 388 determines where the seed will be in its final seed location in furrow 162.

As an example, meter/delivery system speed integrator 386 integrates the acceleration and speed of the seed meter (if the seed sensor is disposed on the seed meter), and/or the acceleration and speed of the seed delivery system 166 (if the seed sensor is disposed on the seed delivery system). This provides a distance indicator that indicates the distance traveled by the seed. This distance is compared to the dimensions of the meter and/or delivery system 166 to determine when the seed has traveled a sufficient distance that it has reached the exit end of the 6 seed delivery system 166. When this occurs, integrator 386 provides an output indicating that the seed should now be exiting the seed delivery system 166.

Final seed location estimator 388 estimates when the seed has reached its final location based upon the distance it must travel from the exit end of the seed delivery system 166 to the bottom of the furrow 162. Estimator 388 may include factors that accommodate for possible rolling of the seed, or other movement of the seed after it reaches the ground. Final seed location estimator 388 then generates an output indicating that the seed has reached its final location.

Knowing that the seed is in its final location, actuator time offset generator 370 can generate an output indicating any time offset corresponding to the valve/actuator latency or responsiveness. Pulse timing generator 372 and pulse duration generator 374 generate the timing for the valve/actuator control signal and its duration, as described above.

Figure 16:
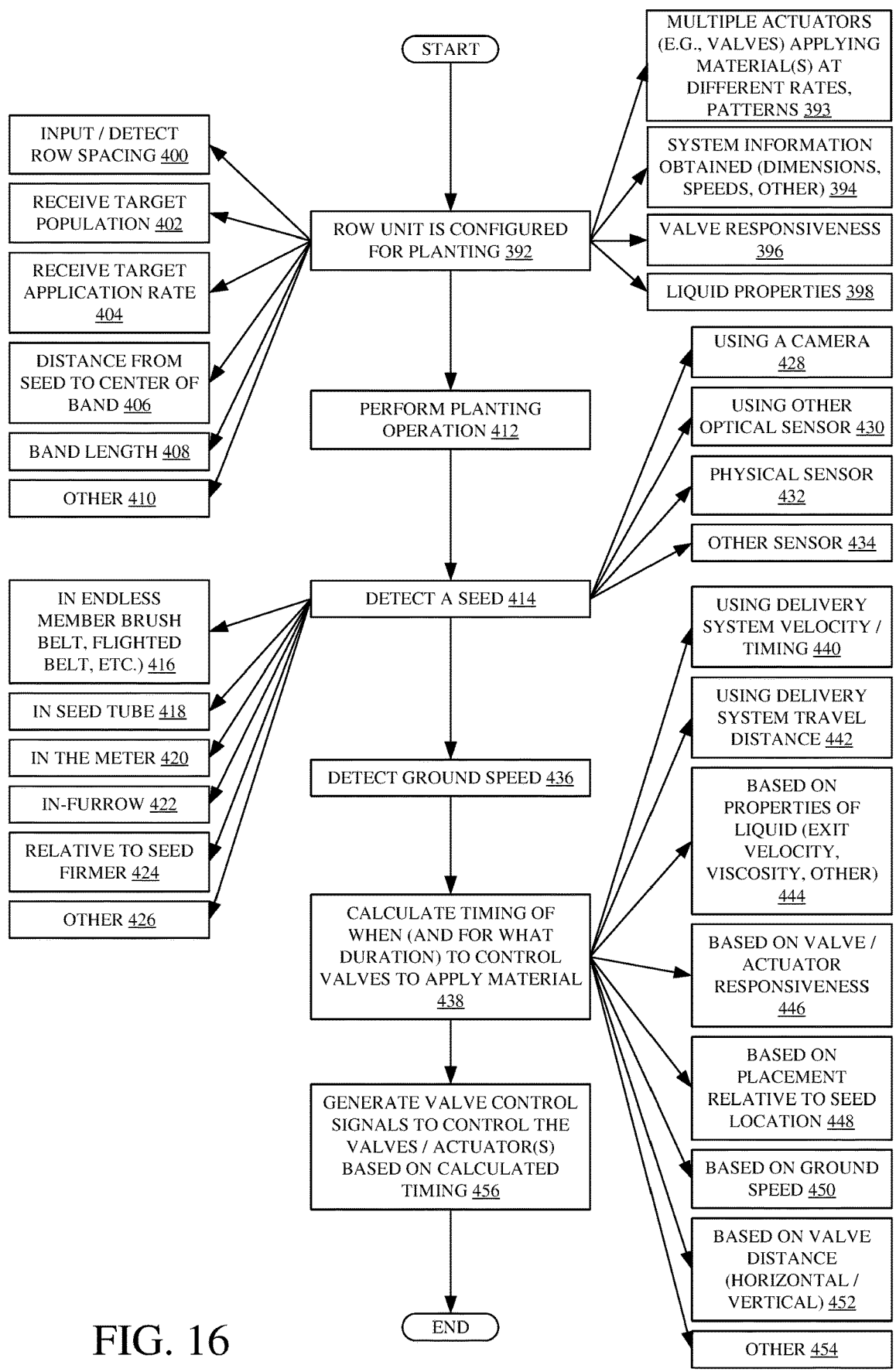
FIG. 16 is a flow diagram showing example of the operation of event driven processing.

FIG. 16 is a flow diagram showing one example of the operation of event driven processing system 266 (discussed with respect to FIG. 15), in more detail. It is first assumed that row unit 106 is configured for planting, as indicated by block 392 in the flow diagram of FIG. 16. Each row unit 106 has a plurality of different actuators 109 that can apply one or more materials at one or more different rates or according to one or more different application patterns, as indicated by block 393. System 266 has thus illustratively sensed or obtained the system information, such as the system dimensions, valve placement, etc., as indicated by block 394. System 266 has also illustratively obtained or sensed actuator responsiveness as indicated by block 396 and the properties of the material (e.g., liquid) being applied as indicated by block 398. System 266 can receive or detect row spacing as indicated by block 400, target population as indicated by block 402, and target application rate as indicated by block 404. System 266 can also detect or receive the application placement. In the present example, it will be assumed that liquid material is to be applied continuously (e.g., according to a broadcast application pattern) by one actuator 109 and in a band about the seed by another actuator 109. In that case, system 266 detects the distance from the seed location to the center of the band (in some examples, the valve/nozzle May be laterally adjustable such that the center of the band may be selectively placed relative to an actual or theoretical seed location), as indicated by block 406. System 266 can detect or receive the desired band length as indicated by block 408, and a wide variety of other information as indicated by block 410.

At some point, the planting operation begins so that row unit 106 is performing the planting operation as indicated by block 412. Because FIG. 16 is discussing the operation of event driven processing system 266, that means that controlling the application of the material is based on an event, such as a seed detection. Therefore, system 266 receives the seed sensor signal 304 indicating that a seed has been detected as indicated by block 414 in the flow diagram of FIG. 16. The seed can be detected by a sensor 122 that is on the seed delivery system 166 (such as on the brush belt or flighted belt) as indicated by block 416. The seed sensor can be sensor 122 on the seed tube 120 as indicated by block 418. The seed sensor can be sensor 122 on the seed meter 124 as indicated by block 420, or it can be arranged so that it detects the seed after it is at its final seed location in the furrow, as indicated by block 422. The seed sensor 122, 122A can be placed on or near a seed firmer as indicated by block 424, or it can be placed in a wide variety of other locations, as indicated by block 426. The seed can be detected using a camera, as indicated by block 428. It can be detected using another type of optical sensor, such as one of the sensors discussed above, as indicated by block 430. The seed can be detected using a physical sensor (such as a deflectable finger sensor that deflects when the seed travels past it, as indicated by block 432. It can be detected using RADAR or LIDAR or a wide variety of other types of sensors as well, and this is indicated by block 434.

Event driven processing system 266 also illustratively detects (or is provided) the ground speed 378, as indicated by block 436 in the flow diagram of FIG. 16.

Event driven processing system 266 then calculates the timing of when to control each of the actuators 109 to apply the material, as indicated by block 438 in the flow diagram of FIG. 16. System 266 can do this using the delivery system velocity or timing, such as by using timing delay generation system 366. Calculating the timing for controlling the valves in this way is indicated by block 440 in the flow diagram of FIG. 16. System 266 can also calculate the timing by using the delivery system travel distance, such as by using travel distance generation system 368, as indicated by block 442 in the flow diagram of FIG. 16. Calculating the control signal timing using the time delay generation system 366 is discussed in greater detail elsewhere herein, including with respect to FIG. 17. Calculating the control signal timing using travel distance generation system 368 is discussed in greater detail elsewhere herein, including with respect to FIG. 18.

The timing of the valve actuation control signals can be calculated based upon the properties of the liquid or other material being applied (such as the desired exit velocity, viscosity, etc.). This is indicated by block 444. The timing can be calculated based on the valve/actuator responsiveness as indicated by block 446. The timing can be based upon the desired material placement relative to the final seed location, as indicated by block 448. The timing can be calculated based upon the ground speed of row unit 106, as indicated by block 450. The timing can be calculated based on the actuator location (such as the horizontal or vertical location of the actuators 109 on row unit 106), as indicated by block 452 in the flow diagram of FIG. 16.

At block 452, for instance, the actuator 109 may have a camera located on it so that the seed can be sensed in close proximity to the actuator 109. The camera may be on a seed firmer so that it detects the final location of the seed in the furrow 162. In any of these cases, the actuator location on row unit 106 is known, at least relative to other items so that it can be actuated at the appropriate or desired time.

The timing can be calculated in a wide variety of other ways as well, and based on a wide variety of other criteria, as indicated by block 454.

Once the timing is calculated (of when and for what duration to control the actuators to apply the material), at block 438, this is provided to valve control signal generator 258 (shown in FIG. 13), which generates valve control signals to control the valves/actuators 109 based upon the calculated timing, as indicated by block 456 in the flow diagram of FIG. 16.

Figure 17:
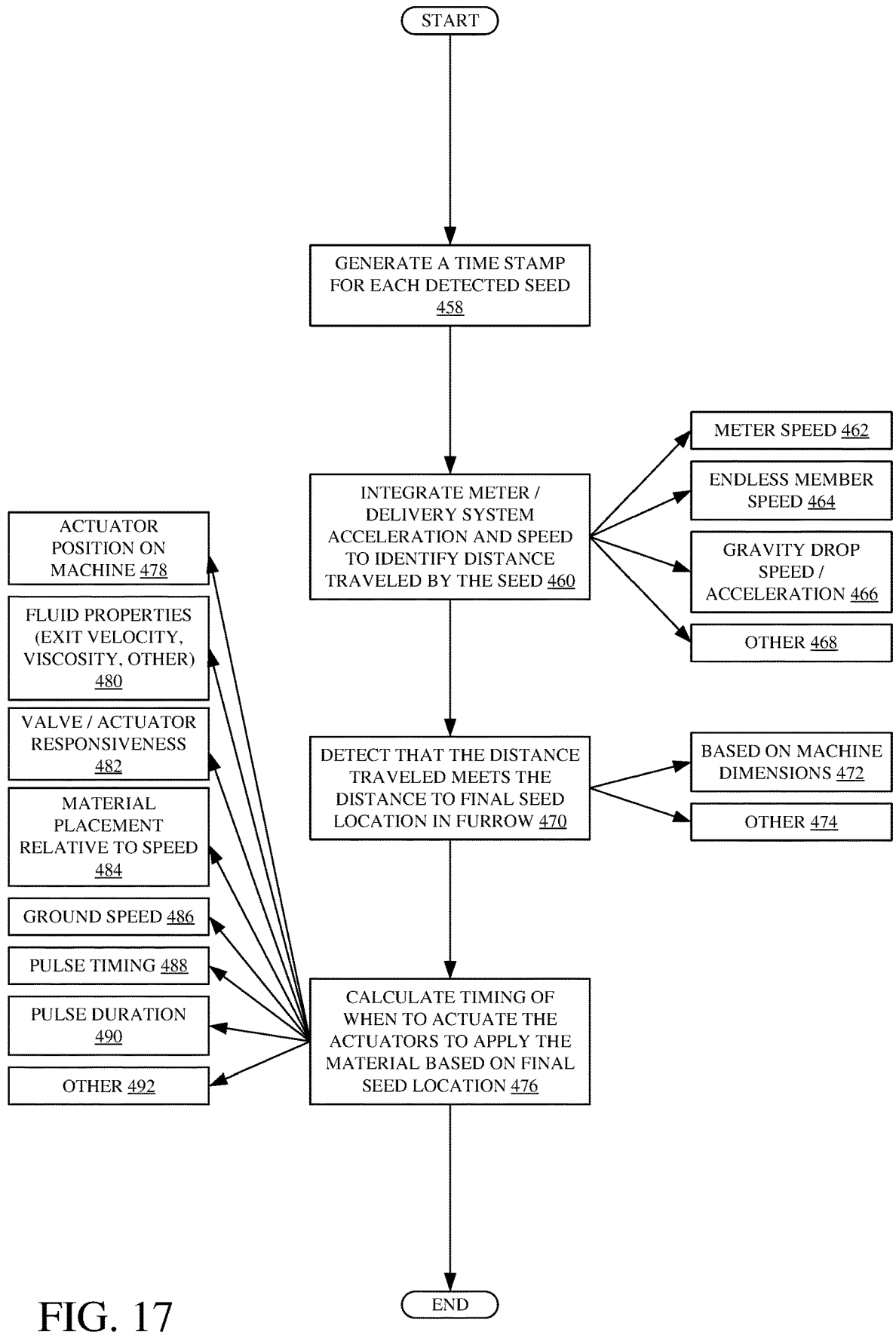
FIG. 17 is a flow diagram showing one example of the operation of a travel distance generation system.

FIG. 17 is a flow diagram illustrating one example of the operation of event driven processing system 266, where system 266 uses travel distance generation system 368 to calculate the timing for valve actuation. Thus, in the example described with respect to FIG. 17, time stamp generator 364 receives seed sensor signal 304 and generates a time stamp when signal 304 indicates that a seed has been detected. Generating a time stamp indicated by block 458 in the flow diagram of FIG. 17.

Meter/delivery system speed integrator 386 then integrates the meter and/or delivery system acceleration and speed (depending upon where the seed was sensed) to identify a distance that the seed has traveled, since it was sensed, as indicated by block 460. For instance, where the seed is sensed in meter 124, integrator 386 integrates over the meter acceleration and speed, as indicated by block 462. Where the seed is sensed in the endless member (or delivery system 166) integrator 386 integrates the endless member acceleration and speed, as indicated by block 464. It will be noted that if the seed is detected in the meter, the integration will be performed both over the meter acceleration and speed (until the seed exits meter 124 into delivery system 166) and then over the endless member or delivery system 166 acceleration and speed, as indicated by block 464. Where the delivery system is a seed tube, then integrator 386 integrates (or double integrates) over the gravity drop speed or acceleration of the seed, as indicated by block 466 (of course, other factors may be taken into account, such as friction and forward travel speed of the row unit). The integration can be performed in other ways as well, and this is indicated by block 468.

For instance, once the seed exits the seed delivery system 166, the integration may also be performed over the speed or acceleration of the seed, as it drops into furrow 162. This will account for the change in seed position after it leaves the delivery system. In a scenario where the seed is ejected from delivery system 166 with a velocity that is equal in magnitude but opposite in direction relative to the forward travel direction of row unit 106, then the seed will fall substantially only under the influence of gravity, after it leaves delivery system 166.

Final seed location estimator 388 then detects when the distance traveled meets the distance from where the seed was sensed, to the final seed location in the furrow 162, as indicated by block 470. This estimation can be based upon the machine dimensions (such as the size of the meter, delivery system, etc.), as indicated by block 472. It can be based on other items as well, and this is indicated by block 474.

Event driven processing system 266 then calculates the timing of when to actuate the actuators 102 to apply the material based upon the final seed location, as indicated by block 476 in the flow diagram of FIG. 17. Actuator time offset generator 370 illustratively generates a time offset that corresponds to the location of each actuator 109 on row unit 106. For instance, if an actuator 109 is located well behind the seed delivery system, then the time delay may be longer. If an actuator 109 is located closely proximate the seed delivery system, then the time delay may be shorter. Calculating a time delay based on actuator position is indicated by block 478 in the flow diagram of FIG. 17.

Actuator time offset generator 370 can also illustratively generate an offset value based upon the properties of the material being applied (such as its exit velocity, viscosity, etc.), as indicated by block 480. Generator 370 can generate a time delay based upon the valve or actuator responsiveness, as indicated by block 482, and it can generate a delay or offset based upon the desired placement of the material relative to the final seed location, as indicated by block 484. Generator 370 can generate these time offsets based upon the ground speed of row unit 106 as well, as indicated by block 486.

Based upon the timing, and the time stamp corresponding to the seed, pulse timing generator 372 generates a timing output indicating when the actuator 109 should be actuated. Generating the timing output is indicated by block 488. Pulse duration generator 374 provides an output indicating how long the actuator should be actuated, as indicated by block 490. The timing of when to actuate the actuators 109 to apply the material based on the final seed location can be done in a wide variety of other ways as well, as indicated by block 492 in the flow diagram of FIG. 17.

Figure 18:
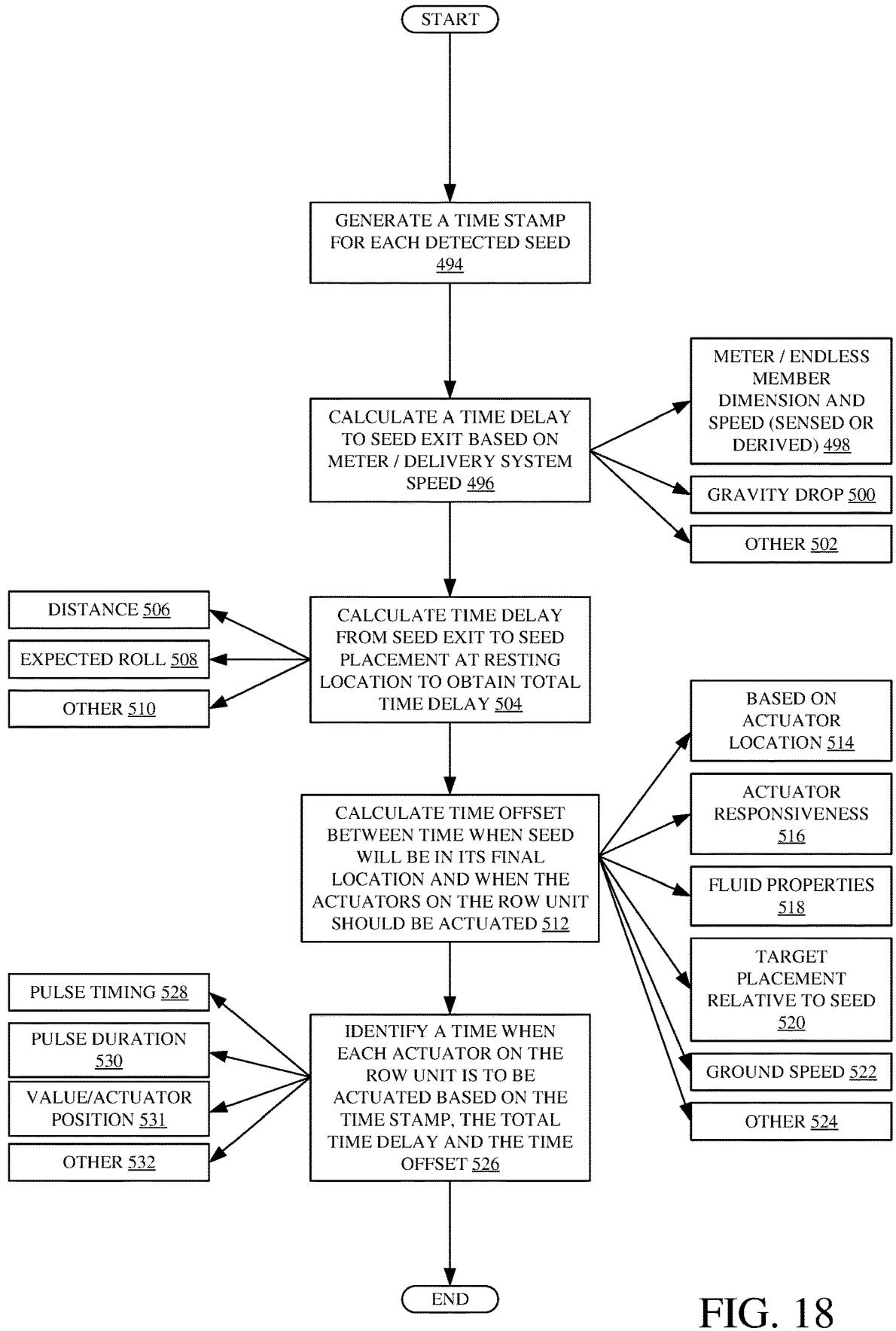
FIG. 18 is a flow diagram showing one example of the operation of a time delay generation system.

FIG. 18 is a flow diagram showing one example of the operation of event driven processing system 266 in an implementation in which system 266 uses time delay generation system 366. It is first assumed that time stamp generator 364 receives an input from seed sensor signal 304 indicating that a seed has been detected. Time stamp generator 364 generates a time stamp for that event, as indicated by block 494 in the flow diagram of FIG. 18. Time delay generation system 366 then generates a time delay incurred by the seed as it moves through to the meter 124 or delivery system 120, 166 (depending upon where the seed was sensed) so that the valve actuation signals can be generated to actuate the actuators to place the material at the desired location, relative to the final seed location. Calculating a time delay to the seed exit from the delivery system 166, based on the meter/delivery system speed is indicated by block 496 in the flow diagram of FIG. 18. Meter/delivery system delay generator 382 can calculate the time delay based upon the speed of the meter 124 and the delivery system 120, 166 (where the seed was detected in the meter) and/or based upon just the speed of the delivery system 120, 166 (where the seed was detected in the delivery system). Calculating timing delay is indicated by block 498. Where the delivery system is a seed tube 120, the time delay for the delivery system can be calculated based upon how long it will take the seed to drop from the seed sensor to the ground, under the force of gravity (considering things such as friction with the seed tube, forward velocity of the row unit, etc.), as indicated by block 500. The time delay for the meter/delivery system can be calculated in other ways as well, as indicated by block 502.

Time delay generation system 366 also calculates the time delay that will be incurred by the seed as it moves from the exit of the seed delivery system 166 to its final location in the furrow 162. This delay, along with the delay attributable to the meter/delivery system, will be the total time delay, as indicated by block 504 in the flow diagram of FIG. 18. The time delay incurred from the exit of the delivery system 166 to the final seed location can be based upon that distance, as indicated by block 506. The delay can also be based on an expected seed roll, where the seed is expected to roll before it settles to its final location, as indicated by block 508. The time delay can be calculated in other ways as well, such as based on the velocity at which the seed is ejected from the delivery system 166, as indicated by block 510.

Actuator time offset generator 370 then calculates a time offset between the time when the seed will be in its final location and when the actuator 109 should be actuated on each row unit 106, as indicated by block 512 in the flow diagram of FIG. 18. The time offset can be based upon the actuator locations on row unit 106, as indicated by block 514. The time offset can be based upon the actuator responsiveness as indicated by block 516 and/or based on the fluid or material properties of the material being applied, as indicated by block 518. The time offset can be based upon the target placement of the material relative to the final seed location, as indicated by block 520. The time offset can be based on the ground speed of row unit 106, as indicated by block 522, and the time offset can be based on a wide variety of other information as well, as indicated by block 524.

Pulse timing generator 372 and pulse duration generator 374 then identify a time when each of the actuators 109 on the row unit 106 are to be actuated, based upon the total time delay and the time offset discussed above. This is indicated by block 526. For instance, pulse timing generator 372 generates an output indicative of when each valve/actuator control signal is to be applied to each actuator to open it (or turn it on), based upon the time stamp, the total time delay, and the time offset, as discussed above. This is indicated by block 528. Pulse duration generator 374 generates an output indicative of how long each actuator 109 should be on/open, as indicated by block 530. If the application rate is to vary over the pulse duration, then each actuator (e.g., valve) position can be controlled as well, as indicated by block 531. The time when each of the actuators should be actuated, and the duration and position, can be identified in other ways as well, and this is indicated by block 532.

Figure 19:
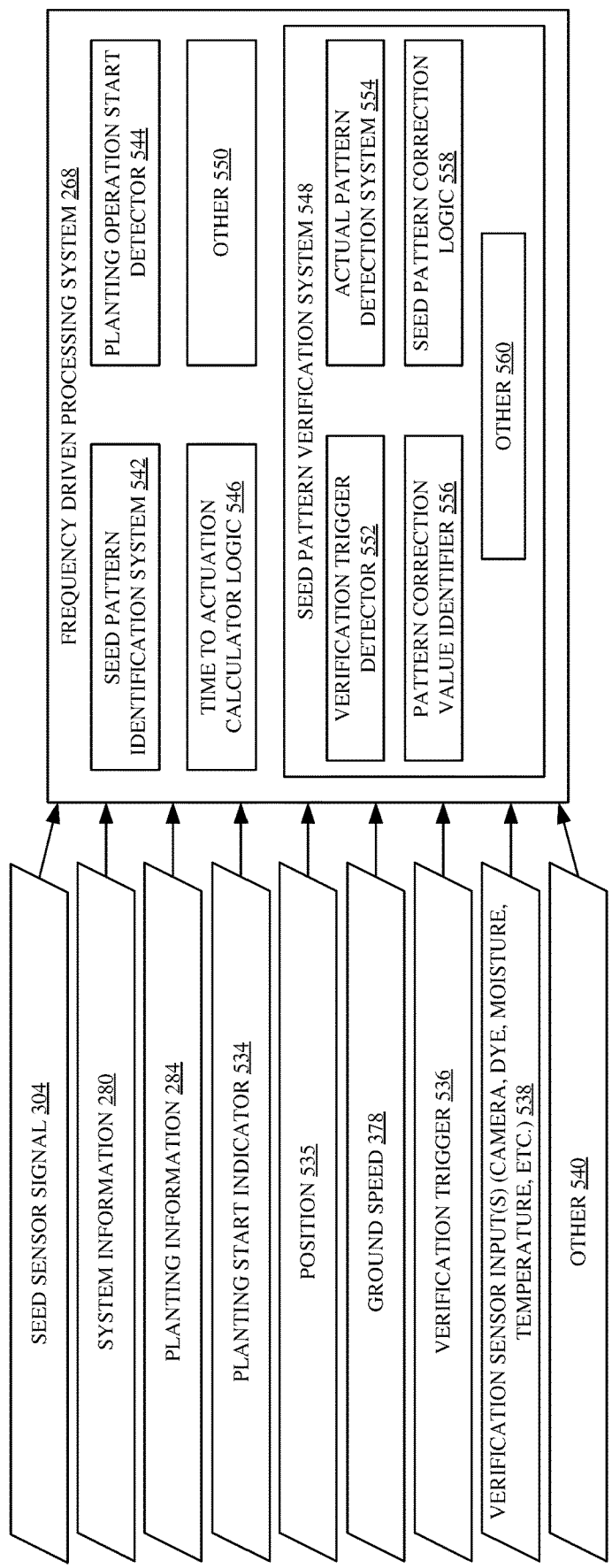
FIG. 19 is a block diagram showing one example of a frequency driven processing system.

FIG. 19 is a block diagram showing one example of the frequency driven processing system 268 in more detail. The present discussion proceeds with respect to generating a prior seed pattern (prior to beginning the planting or application operation) and then applying material based on that pattern. However, the opposite can be done as well. The material can be applied first, to obtain a prior material pattern (obtained prior to planting). The seeds can then be planted, relative to the material, based on the prior material pattern. For instance, where the material is fertilizer, the fertilizer can be applied first, and the seeds can be planted later, based on the pattern used to apply the fertilizer. Also, while the present discussion proceeds with respect to generating the prior seed pattern, it could instead be a plant pattern where the material is applied relative to the location of plants, instead of seeds.

FIG. 19 shows that system 268 can illustratively receive a variety of inputs, some of which are the same as those discussed above, and are similarly numbered. System 268 also illustratively receives a planting start indicator 534 that can be generated from planting start signal generator 316.

Some examples of the planting start signal generator 316 are discussed elsewhere herein. System 268 can receive a verification trigger 536 generated from verification trigger generator 318. System 268 can also receive verification sensor inputs 538 that are generated by verification sensors 320, and a wide variety of other information 540 as well.

In the example shown in FIG. 19, frequency driven processing system 268 illustratively includes seed pattern identification system 542, planting operation start detector 544, time to actuation calculator logic 546, seed pattern verification system 548, and other items 550. Seed pattern verification system 548, itself, illustratively includes verification trigger detector 552, actual pattern detection system 554, pattern correction value identifier 556, seed pattern correction logic 558, and it can include other items 560.

Seed pattern identification system 542 generates a prior seed pattern that identifies, once the seeding operation begins, where seeds will eventually be placed. Planting operation start detector 544 detects when the planting operation begins based on the planting start indicator 534, and time to actuation calculator logic 546 calculates timing for when each of the actuators 109 on each row unit 106 should be actuated to apply the material, based upon the seed locations in the prior seed pattern, based upon the current position of row unit 106, and based upon the ground speed of row unit 106. Thus, frequency driven processing system 268 can apply the material before the seeds are placed in furrow 162, or after they are placed there, or simultaneously with seed placement. This is because the prior seed pattern identifies how often seeds will be planted, once row unit 106 begins the operation. This, along with the system information that defines where each of the actuators 109 is on the row unit 106 relative to the different parts of the row unit 106, and the ground speed information indicating how quickly the row unit 106 is traveling, can be used to actuate the actuators in order to apply the material at desired locations, relative to the seed positions.

It may be, however, that the prior seed pattern is slightly inaccurate, or becomes less accurate over time. Thus, seed pattern verification system 548 can be used to verify and correct the prior seed pattern. Verification trigger detector 552 detects when a verification trigger is present, indicating that a verification operation should be performed. The prior seed pattern can be verified at certain time intervals, at intervals of distance traveled by row unit 106, at intervals of a number of seeds that have been planted (or should have been planted), at intervals corresponding to material application rate, or the trigger can be a wide variety of other items.

Again, while the present description proceeds with respect to correcting the prior seed pattern, this is just one example. When a prior fertilizer pattern is generated, the prior fertilizer pattern can be corrected based on a verification input verifying that the pattern is correct, such as a moisture sensor input that senses increased moisture due to liquid fertilizer, a dye sensor (such as an optical or other sensor), a temperature sensor, etc. These sensor inputs indicate the actual presence of liquid fertilizer and can thus be used to correct the prior fertilizer pattern.

Once triggered, actual pattern detection system 554 detects the actual seed pattern. For instance, system 554 can be event driven processing system 266 that detects the actual seed pattern based upon an actual event, such as a seed detection. The actual pattern can be detected in a wide variety of other ways as well, and using the event driven approach discussed above is only one example.

Pattern correction value identifier 556 can compare the actual seed pattern to the prior seed pattern that is being used by frequency driven processing system 268 in order to apply the material. Pattern correction value identifier 556 can identify an error value that indicates how the prior seed pattern may be inaccurate, based upon the actual seed pattern. For instance, for a wide variety of different reasons, it may be that the prior seed pattern has shifted timing of the material application so it is a distance, e.g., several inches, from where it is actually desired. Detecting the actual seed pattern and calculating a correction value can be performed by pattern correction value identifier 556.

The correction value is illustratively provided to seed pattern correction logic 558, which performs a correction on the prior seed pattern to generate a corrected prior seed pattern. The corrected prior seed pattern can then be used by frequency driven processing system 268 in applying the material, in the future. It will be noted that the verification process can be repeated and the corrected prior seed pattern can, itself, be corrected should it become inaccurate.

Figure 20A:
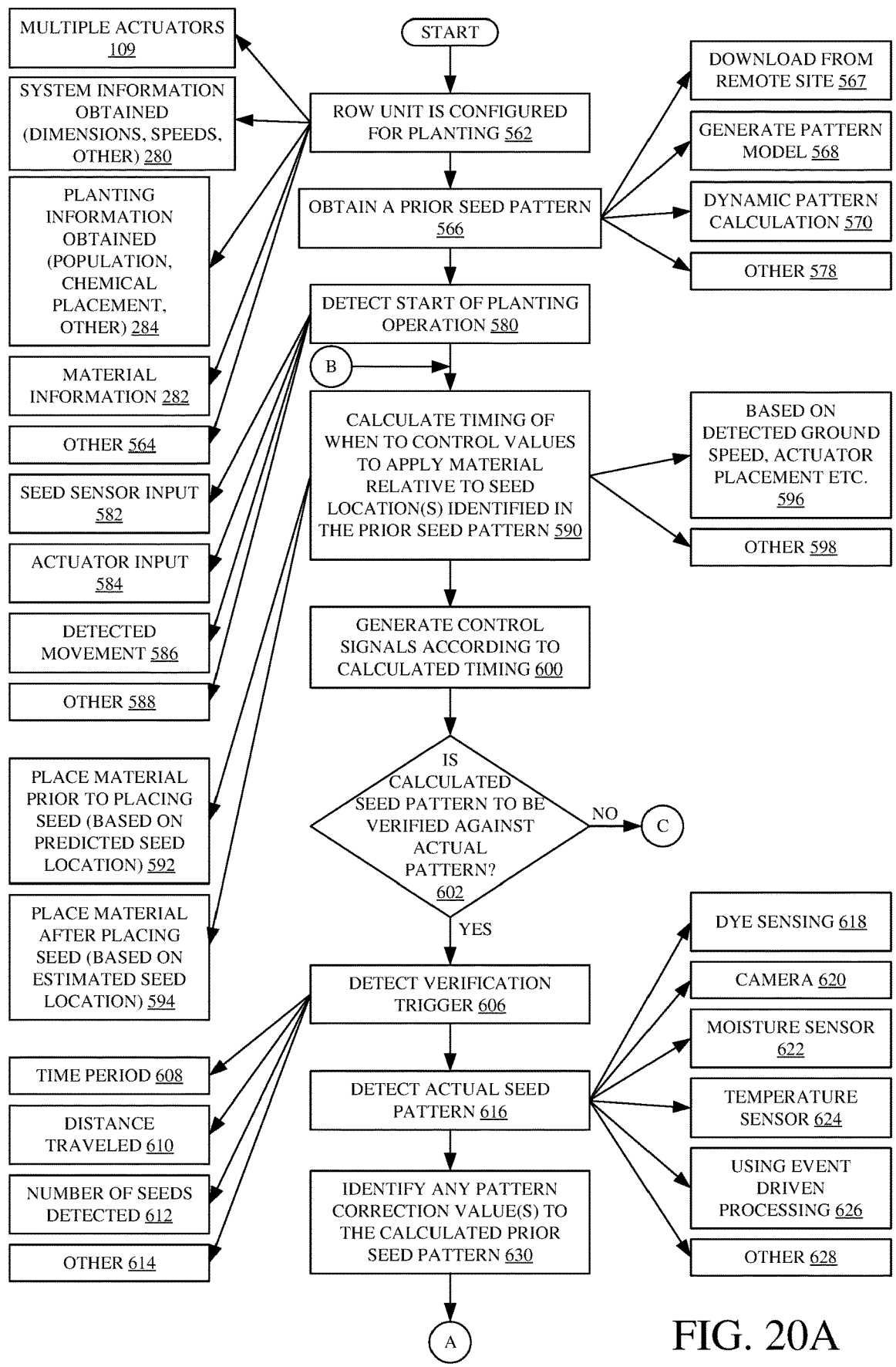
FIGS. 20A and 20B (collectively referred to herein as FIG. 20) show a flow diagram illustrating one example of the operation of the frequency driven processing system illustrated in FIG. 19.
Figure 20B:
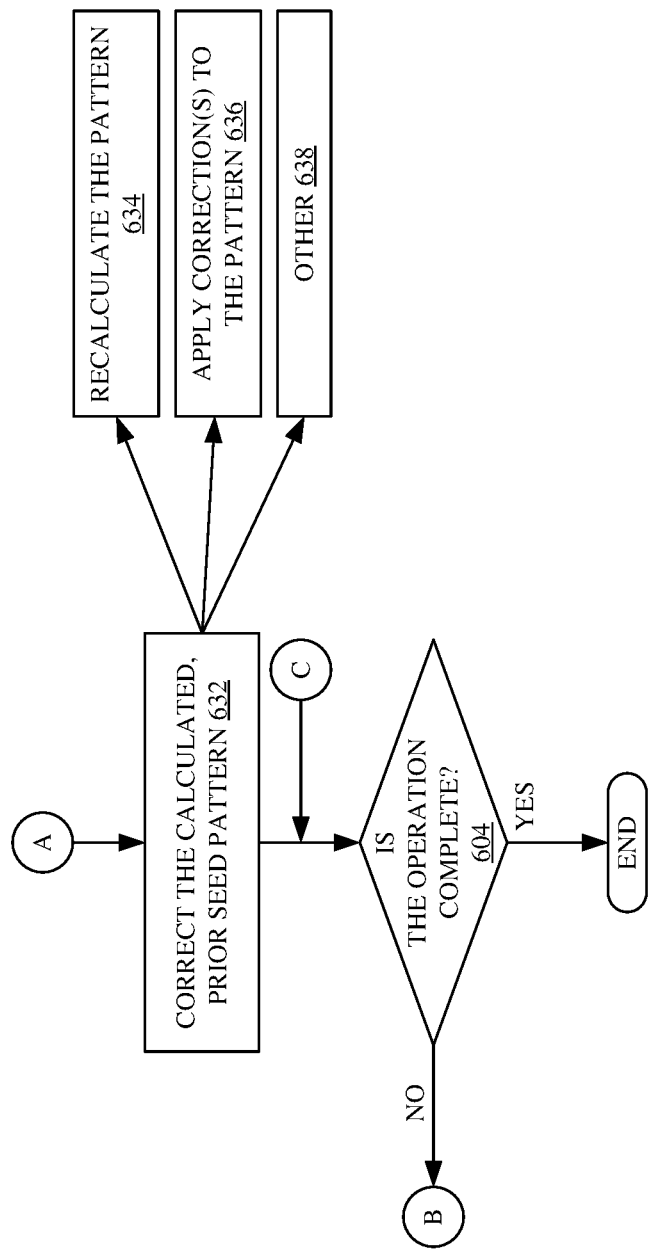

FIGS. 20A and 20B (collectively referred to herein as FIG. 20) show a flow diagram illustrating one example of the operation of frequency driven processing system 268 in more detail. It is first assumed that row unit 106 is configured for planting, indicated by block 562 in the flow diagram of FIG. 20. Row unit 106 will illustratively have a plurality of different, independently controllable, actuators 109 that can apply the same or different materials at the same or different rates, and/or according to the same of different material application patterns. The material application control system 113 will illustratively have obtained or be configured to sense, system information 280. System 113 will also be configured to obtain or sense planting information 284, material information 282, and it can be configured in a wide variety of other ways as well, as indicated 564.

A prior seed pattern is then obtained, as indicated by block 566. The prior seed pattern can be downloaded from a remote site (in an example in which it was previously generated and stored), as indicated by block 567. Seed pattern identification system 542 can calculate a prior seed pattern. This can be done using a pattern model where inputs include values for the different systems, planting and material variables, along with prior information, and other information. When that information is applied to the model, the model may generate a seed pattern that can be used by frequency driven processing system 268. Generating the pattern using a pattern model is indicated by block 568. Seed pattern identification system 542 can generate the seed pattern dynamically using a dynamic pattern calculation mechanism that considers the variable values, as indicated by block 570. The seed pattern can be calculated in other ways as well, and this is indicated by block 578.

The prior seed pattern will identify such things as seed placement timing, the offsets between when a seed is placed and when the various actuator signals should be applied to valves 109, among other things. Thus, once the planting operation has started, the prior seed pattern can be used to generate actuator control signals to control the actuators 109 to apply the one or more materials where desired, relative to the seed positions, based on the timing indicated in the prior seed pattern.

At some point, the planting operation will begin, and this can be detected by planting operation start detector 544. Detecting the start of the planting operation is indicated by block 580, and it can be done in a wide variety of different ways. For instance, a seed sensor 122, 122A can generate a signal indicating the presence of a seed in the delivery system, and this detection may indicate that the planting operation has begun, as indicated by block 582. It may be that operator 92 actuates an operator input mechanism in the operating compartment of the towing vehicle 94 to start the planting operation. This actuation may be detected as indicated by block 584. It may be that movement of row unit 106, or the delivery system, or seed meter, may be detected as the beginning of the planting operation, as indicated by block 586. The start of the planting operation can be detected in a wide variety of other ways as well, as indicated by block 588.

Time to actuation calculator logic 546 then calculates the time when the actuators on each row unit 106 are to be controlled to apply the material, relative to the seed placement timing identified in the prior seed pattern, as indicated by block 590 in the flow diagram of FIG. 20. It may be that the material is to be placed by one or more of the actuators 109 before the seed is planted, because the timing for the seed to arrive at its final location is already known in the prior seed pattern. Placing the material prior to placing the seed is indicated by block 592. The material may be placed by one or more of the actuators 109 after the seed is placed, again based upon the estimated seed placement timing in the prior seed pattern, as indicated by block 594. The timing can be generated based upon the detected ground speed, actuator placement, and/or any of the other system information, material information, planting information or sensor value inputs, as indicated by block 596. The timing can be calculated in a wide variety of other ways as well, as indicated by block 598.

The timing is then provided to valve control signal generator 258 (shown in FIG. 13), which generates the actuator control signals for each of the independently controllable actuators 109 and applies them to actuators 109 according to the calculated timing, as indicated by block 600 in the flow diagram of FIG. 20.

In some implementations, it may be that the prior seed pattern is to occasionally be verified and/or corrected, as indicated by block 602. If not, processing proceeds at block 604 where the operation continues until the planting operation is complete.

However, if, at block 602, it is determined that the prior seed pattern is to be verified and/or corrected, then at some point verification trigger detector 552 detects a verification trigger indicating that a verification and/or correction operation is to be performed, as indicated by block 606 in the flow diagram of FIG. 20. The trigger can be a time-based trigger, as indicated by block 608. The trigger can be a distance-based trigger as indicated by block 610. The trigger can be a number of seeds-based trigger as indicated by block 612, or the trigger can be any of a wide variety of other triggers, as indicated by block 614.

Actual pattern detection system 554 illustratively detects the actual seed pattern to identify whether the material is being applied, as desired. If the actual seed pattern is shifted from the prior seed pattern, or is different in another way, then it is likely that the material is not being applied, as desired. Detecting the actual seed pattern is indicated by block 616 in the flow diagram of FIG. 20.

There are a wide variety of different ways to detect whether the material is being applied, as desired. These can be the same as how the material is sensed in a scenario in which a prior fertilizer pattern is generated instead of a prior seed pattern. For instance, it may be that the material has dye added to it and the dye can be sensed by an optical sensor, such as a camera, which may also be equipped to detect the seed as well. In that case, actual pattern detection system 554 can detect whether the dyed material is being applied at the desired placement, relative to the seed location. In another example, a camera can be used, in conjunction with a position detector, to detect actual seed location. Detecting the actual seed location using dye sensing is indicated by block 618 and detecting it with a camera is indicated by block 620.

In another example, the material being applied can be sensed in different ways. Where the material is a liquid material, a moisture sensor can be used to detect where the material is applied. The moisture sensor may indicate an elevated moisture level in areas where the liquid material has just been applied, over the areas where it has not been applied. Detecting the actual pattern using a moisture sensor is indicated by block 622.

The actual pattern can also be detected using a temperature sensor. For instance, where the material being applied is warmer or cooler than the ground, a temperature sensor can be used to sense that temperature difference to provide an indication of where the material is being applied. Sensing the pattern using a temperature sensor is indicated by block 624.

As discussed herein, the event driven processing system 266, which senses the seed position based upon an actual event (such as an output from the seed sensor 122, 122A) can also be used to detect or verify the prior seed pattern, as indicated by block 626. The actual seed pattern can be detected in a wide variety of other ways as well, as indicated by block 628.

Based upon the actual pattern detected by system 554, pattern correction value identifier 556 identifies any pattern correction values to the prior seed pattern, as indicated by block 630. By way of example, the correction values may be distance values which indicate a difference in geographic position, or relative position, of the seed location in the prior seed pattern versus the actual seed location. The correction values may be timing values, which correct the timing of the valve/actuator control signals. For instance, it may be that the prior pattern has the valve/actuator signals being triggered too frequently, or not frequently enough. Thus, the correction values may be timing values.

Once the correction values are identified, seed pattern correction logic 558 illustratively corrects the calculated, prior seed pattern, based upon the correction values, as indicated by block 632. In doing so, logic 558 can recalculate the entire prior seed pattern using the correction values, as indicated by block 634. Logic 558 can simply apply the correction values to the already calculated prior seed pattern, as indicated by block 636. Logic 558 can correct the prior seed pattern in other ways as well, as indicated by block 638.

Until the planting operation is complete, operation reverts to block 590 where the system continues to identify the timing for generating the valve/actuator control signals to actuate the valve/actuators 109 using the prior seed pattern or corrected pattern, as indicated by block 604.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Further, as discussed elsewhere herein, the present discussion has proceeded primarily with respect to fertilizer or other material application being controlled based on a prior seed location or seed pattern. However, this is just one example. In another example, seed location can be controlled based on a prior fertilizer (or other material) location or pattern. Similarly, instead a prior or seed location, a prior plant location can be used as well.

Figure 21:
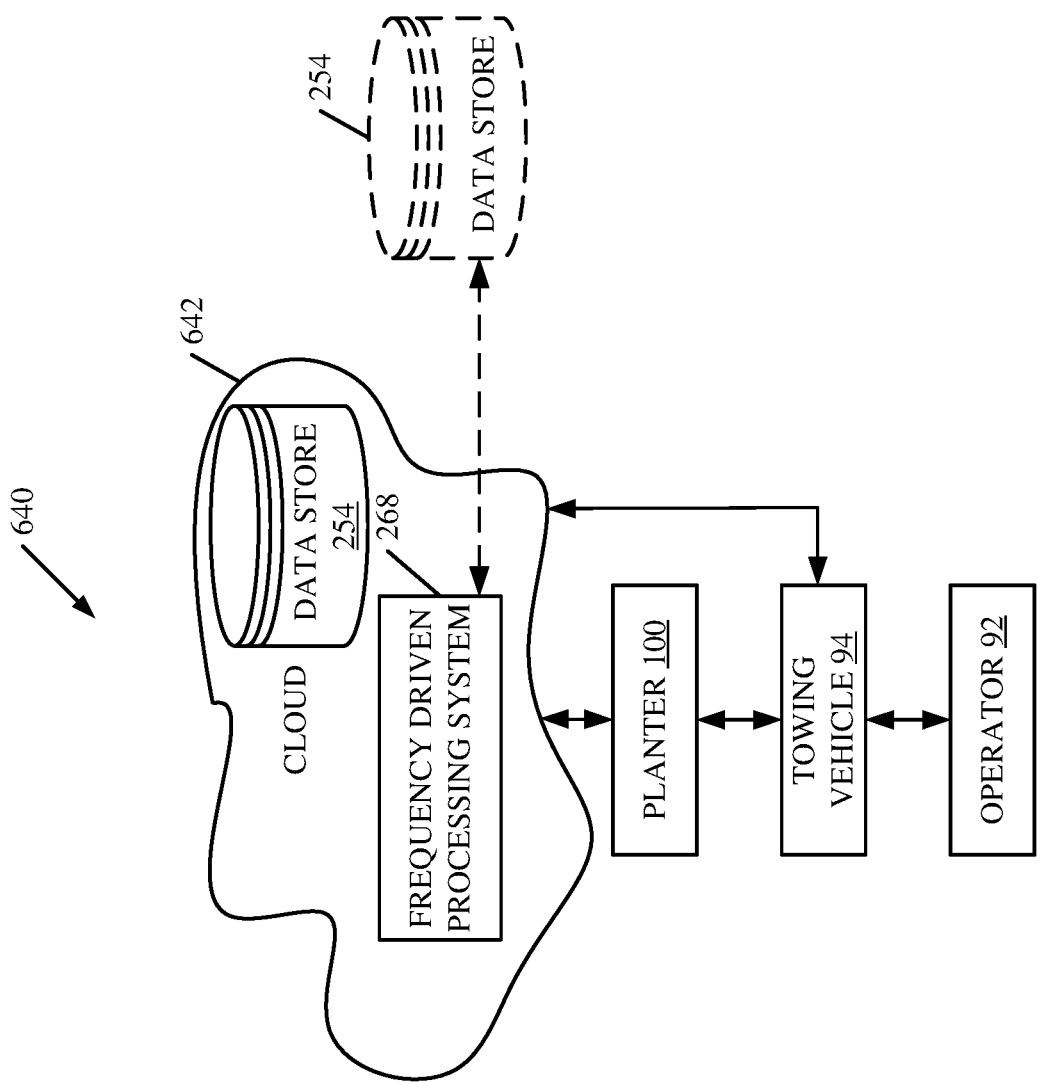
FIG. 21 shows one example of the architecture illustrated in FIG. 1, deployed in a remote server environment.

FIG. 21 is a block diagram of the architecture, shown in FIG. 1, except that planter communicates with elements in a remote server architecture 640. In an example, remote server architecture 640 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 13 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 21, some items are similar to those shown in FIGS. 1 and 13 and they are similarly numbered. FIG. 21 specifically shows that frequency driven processing system 268 and data store 254 (or other items in agricultural system 90) can be located at a remote server location 642. Therefore, parts of system 113 can access those systems through remote server location 642.

FIG. 21 also depicts another example of a remote server architecture. FIG. 21 shows that it is also contemplated that some elements of FIGS. 1 and 13 can be disposed at remote server location 642 while others are not. By way of example, data store 254 can be disposed at a location separate from location 642, and accessed through the remote server at location 642. Regardless of where the elements are located, the elements can be accessed directly by system 113, through a network (either a wide area network or a local area network), the elements can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the planter comes close to the fuel truck for fueling, the system automatically collects the information from the planter using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the planter until the planter enters a covered location. The planter, itself, can then send the information to the main network.

It will also be noted that the elements of FIGS. 1 and 13, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 22:
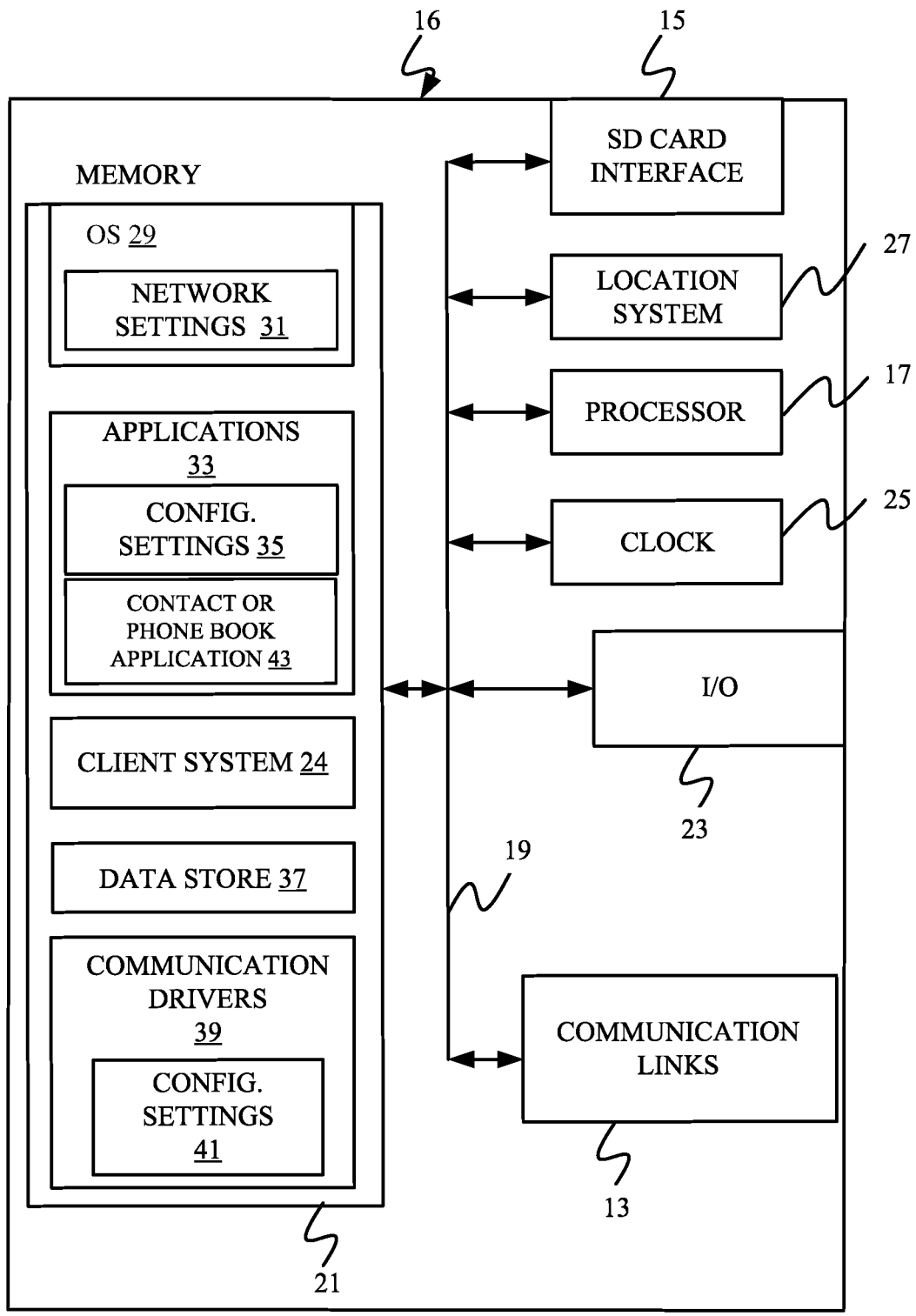
FIGS. 22, 23, and 24 show examples of mobile devices that can be used as operator interface mechanisms in the architectures shown in the previous Figures.
Figure 23:
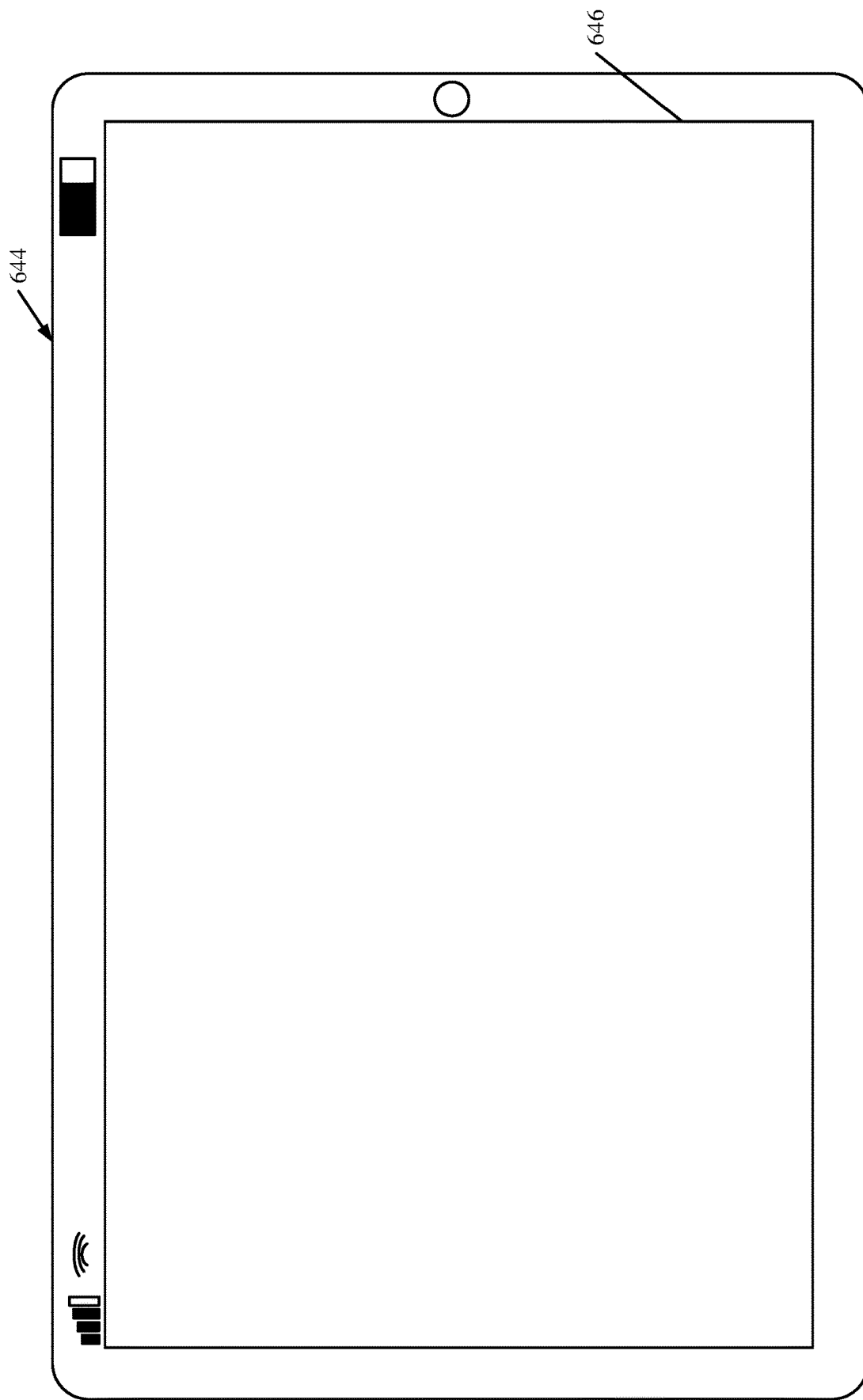
Figure 24:
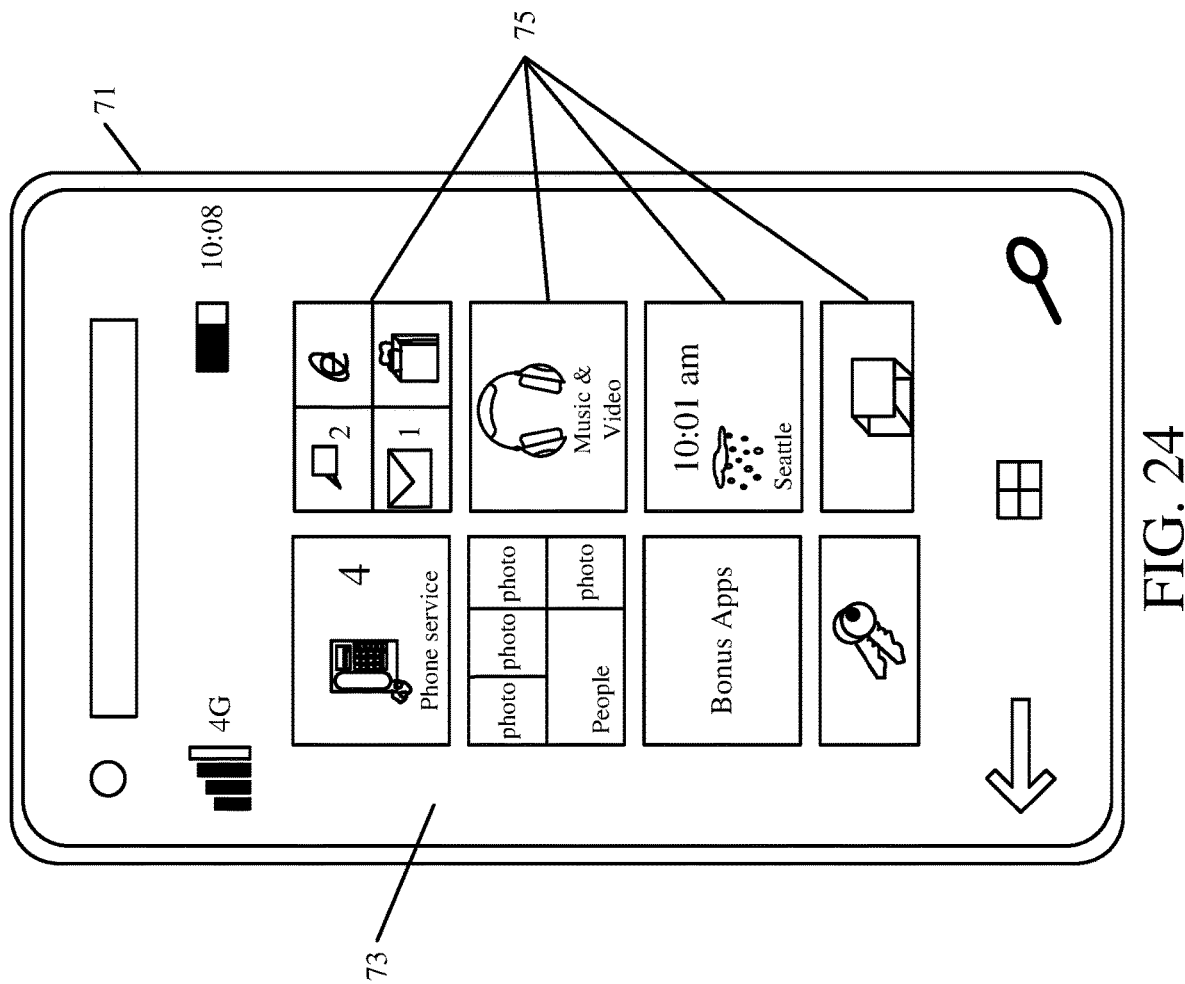

FIG. 22 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 94 for use in generating, processing, or displaying the application data. FIGS. 23-24 are examples of handheld or mobile devices.

FIG. 22 provides a general block diagram of the components of a client device 16 that can run some components shown in FIGS. 1 and 13, that interacts with those components, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a GNSS, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 23 shows one example in which device 16 (from FIG. 33) is a tablet computer 644. In FIG. 23, computer 644 is shown with user interface display screen 646. Screen 646 can be a touch screen or a pen-enabled interface that receives inputs from a pen or stylus. Computer 644 can also use an on-screen virtual keyboard. Of course, computer 644 might also be attached to a keyboard or other user input device through a suitable attachment mechanism, such as a wireless link or USB port, for instance. Computer 644 can also illustratively receive voice inputs as well.

FIG. 24 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 25:
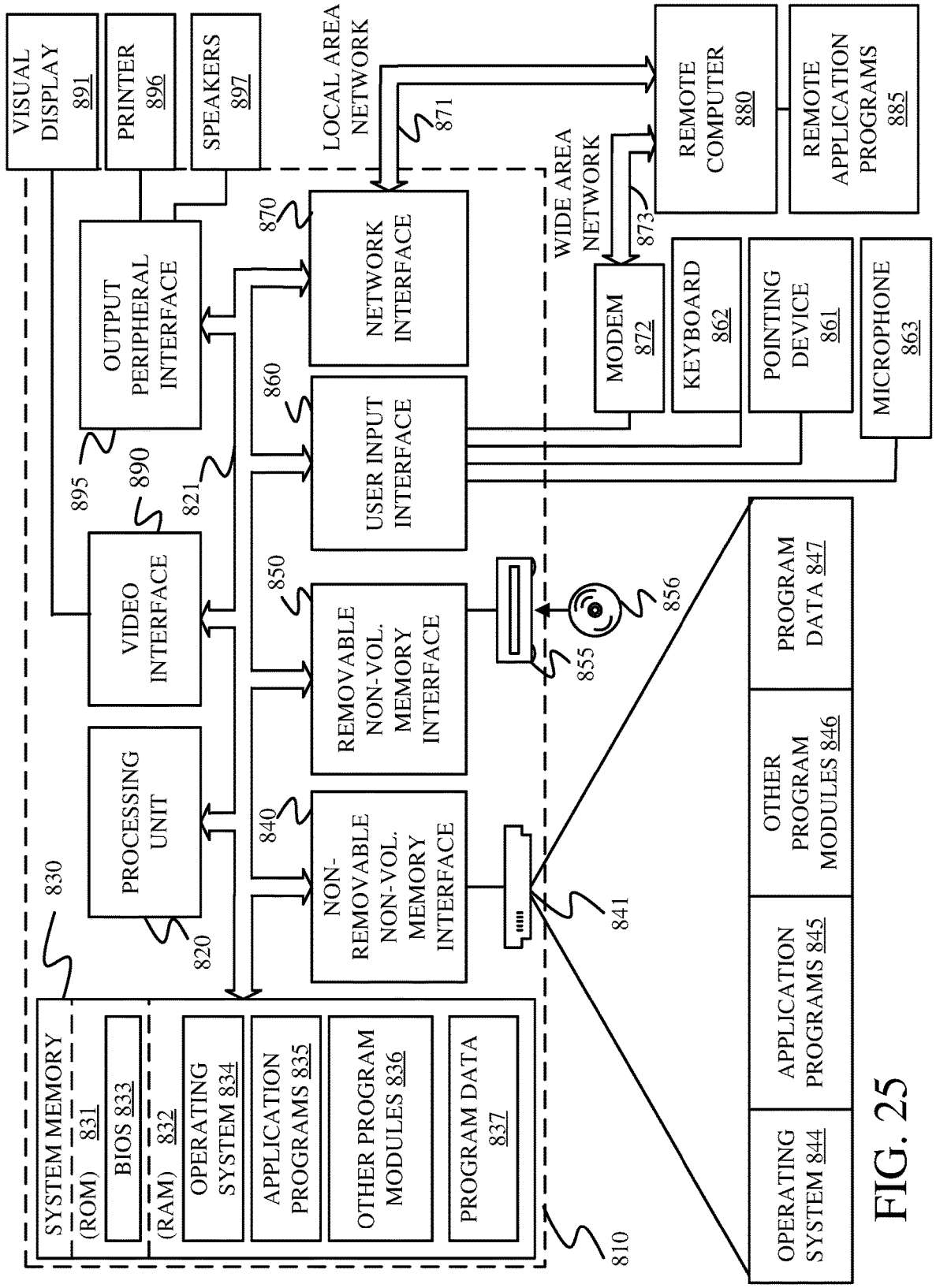
FIG. 25 is a block diagram showing one example of a computing environment that can be used in the architectures shown in the previous Figures.

FIG. 25 is one example of a computing environment in which elements of FIGS. 1 and 13, or parts of it, (for example) can be deployed. With reference to FIG. 25, an example system for implementing some embodiments includes a computing device in the form of a computer 810 programmed to operate as described above. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 13 can be deployed in corresponding portions of FIG. 25.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 25 illustrates operating system 834, application programs 835, other program modules 836, and program data 837.

The computer 810 may also include other removable/non-removable volatile/nonvolatile computer storage media. By way of example only, FIG. 25 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 25, provide storage of computer readable instructions, data structures, program modules and other data for the computer 810. In FIG. 25, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the 23 monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 25 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A planting machine, comprising:
   a plurality of row units, each row unit of the plurality of row units comprising:
      a furrow opener configured to open a furrow as the planting machine moves across a field;
      a seed delivery system configured to deliver seeds to seed locations in the furrow;
      a first actuator configured to be actuated to apply material to the field;
      a second actuator configured to be actuated to apply material to the field;
      an actuator timing system configured to generate, based on the seed locations, an actuator timing indicator indicative of a timing for actuating the first actuator according to a first application pattern; and
      a material application control system configured to generate, based on the actuator timing indicator, a first actuator control signal to control the first actuator to apply material according to the first application pattern, the material application control system being configured to generate a second actuator control signal to control the second actuator to apply material according to a second application pattern independent of the seed locations, the second application pattern being different from the first application pattern.

2. The planting machine of claim 1 wherein the actuator timing system is configured to generate the actuator timing indicator indicative of the timing for actuating the first actuator according to an intermittent application pattern, the material application control system generating the second actuator control signal to actuate the second actuator according to a broadcast application pattern.

3. The planting machine of claim 1 wherein the actuator timing system is configured to generate the actuator timing indicator indicative of the timing for actuating the first actuator to apply the material at a first application rate and for actuating the second actuator to apply the material at a second application rate that is different from the first application rate.

4. The planting machine of claim 1 wherein the first actuator is configured to be actuated to apply a first material and wherein the second actuator is configured to be actuated to apply a second material that is different from the first material.

5. The planting machine of claim 1 wherein the first actuator is configured to be actuated to apply a first material and wherein the second actuator is configured to be actuated to apply the first material.

6. The planting machine of claim 1 wherein the first actuator comprises a first solenoid valve.

7. The planting machine of claim 6 wherein the second actuator comprises a second solenoid valve, independently controllable from the first solenoid valve.

8. An agricultural system, comprising:
   a row unit on a planting machine, comprising:
      a furrow opener configured to open a furrow as the planting machine moves across a field;
      a seed delivery system configured to deliver seeds to seed locations in the furrow;
      a first actuator configured to be actuated to apply material to the field; and
      a second actuator configured to be actuated to apply material to the field; and
   an actuator control system configured to generate, based on the seed locations, a first actuator control signal to control the first actuator to apply material to the field according to a first application pattern and to generate a second actuator control signal to control the second actuator to apply material to the field according to a second application pattern independent of the seed locations.

9. The agricultural system of claim 8 wherein the actuator control system is configured to generate the first actuator control signal to control the first actuator to apply the material to the field intermittently based on the seed locations.

10. The agricultural system of claim 9 and further comprising:
    a seed sensor configured to sense a seed and generate a seed sensor signal based on the sensed seed.

11. The agricultural system of claim 10 and further comprising:
    a timing system configured to generate a timing indicator indicative of when to actuate the first actuator based on the seed sensor signal.

12. The agricultural system of claim 11 wherein the actuator control system is configured to generate the first actuator control signal to control the first actuator based on the timing indicator.

13. The agricultural system of claim 9 wherein the actuator control system is configured to generate the second actuator control signal to actuate the second actuator according to a broadcast application pattern.

14. The agricultural system of claim 8 wherein the actuator control system is configured to control the first actuator to apply the material at a first application rate and to control the second actuator to apply the material at a second application rate that is different from the first application rate.

15. The agricultural system of claim 8 wherein the first actuator is configured to be actuated to apply a first material and wherein the second actuator is configured to be actuated to apply a second material that is different from the first material.

16. An agricultural system, comprising:
   a furrow opener configured to open a furrow as the furrow opener is moved across a field;
   a seed delivery system configured to deliver seeds to seed locations in the furrow;
   a first actuator configured to be actuated to apply material to the field;
   a second actuator configured to be actuated to apply material to the field; and
   a material application control system configured to generate, based on the seed locations, a first actuator control signal to control the first actuator to apply material according to a first application pattern and a second actuator control signal to control the second actuator to apply material according to a second application pattern independent of the seed locations.

17. The agricultural system of claim 16 wherein the seed delivery system is configured to deliver the seeds to the furrow at seed locations and wherein the material application control system generates the first actuator control signal to control the first actuator to apply the material according to the first application pattern based on the seed locations.

18. The agricultural system of claim 17 and further comprising:
   a seed sensor configured to sense seed and generate a seed sensor signal based on sensed seed, the material application control system generates the first actuator control signal based on the seed sensor signal.

19. The agricultural system of claim 16 wherein the first application pattern is different from the second application pattern.

20. The agricultural system of claim 16 wherein the first actuator is configured to be actuated to apply a first material and wherein the second actuator is configured to apply a second material that is different from the first material.

* * * * *